US008890966B2

(12) United States Patent
Kamada et al.

(10) Patent No.: US 8,890,966 B2
(45) Date of Patent: Nov. 18, 2014

(54) AUTOMATIC IMAGE-CAPTURING APPARATUS, AUTOMATIC IMAGE-CAPTURING CONTROL METHOD, IMAGE DISPLAY SYSTEM, IMAGE DISPLAY METHOD, DISPLAY CONTROL APPARATUS, AND DISPLAY CONTROL METHOD

(71) Applicant: Sony Corporation, Tokyo (JP)

(72) Inventors: Yasunori Kamada, Kanagawa (JP); Takayasu Kon, Tokyo (JP); Yoichiro Sako, Tokyo (JP); Kazunori Hayashi, Tokyo (JP); Itaru Kawakami, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/863,943

(22) Filed: Apr. 16, 2013

(65) Prior Publication Data

US 2013/0229562 A1 Sep. 5, 2013

Related U.S. Application Data

(62) Division of application No. 12/263,665, filed on Nov. 3, 2008, now Pat. No. 8,488,012.

(30) Foreign Application Priority Data

Nov. 6, 2007 (JP) ................................. 2007-288335

(51) Int. Cl.
*H04N 5/232* (2006.01)
(52) U.S. Cl.
CPC ........... *H04N 5/23293* (2013.01); *H04N 5/232* (2013.01)
USPC ................. 348/211.9; 348/211.99; 348/222.1

(58) Field of Classification Search
CPC .......... H04N 5/23248; H04N 5/23267; H04N 5/23261; H04N 5/23258
USPC ............................... 348/211.9, 222.1, 211.99
See application file for complete search history.

(56) References Cited

U.S. PATENT DOCUMENTS 5,708,863 A 1/1998 Satoh et al.
6,259,960 B1 7/2001 Inokuchi
(Continued)

FOREIGN PATENT DOCUMENTS

CN 1816111 A 8/2006
JP 06-030374 A 2/1994
(Continued)

OTHER PUBLICATIONS

Hewagamage et al., Augmented Album: Situation-dependent System for a Personal Digital Video/Image Collection. 2000 IEEE Int'l Conference on Multimedia Computing & Systems, New York, Jul. 30, 2000 to Aug. 2, 2000, vol. 1, pp. 323-326.

(Continued)

*Primary Examiner* — Antoinette Spinks
(74) *Attorney, Agent, or Firm* — Wolf, Greenfield & Sacks, P.C.

(57) ABSTRACT

An automatic image-capturing apparatus including an image-capturing unit configured to capture an image of a subject so as to obtain captured image data; an automatic captured-image obtaining unit configured to automatically obtain the captured image data obtained by the image-capturing unit without being based on an operation of a user; an inclination detection unit configured to detect an inclination in at least one of a pan direction and a tilt direction; and a control unit configured to control the obtaining operation performed by the automatic captured-image obtaining unit on the basis of information on the inclination in the pan direction or in the tilt direction, the inclination being detected by the inclination detection unit.

6 Claims, 18 Drawing Sheets

(56) References Cited

U.S. PATENT DOCUMENTS

| | | |
|---|---|---|
| 6,459,388 B1 | 10/2002 | Baron |
| 6,893,132 B2 | 5/2005 | Mori et al. |
| 7,171,285 B2 | 1/2007 | Kim et al. |
| 7,472,134 B2 | 12/2008 | Kaku |
| 7,512,494 B2 | 3/2009 | Nishiuchi |
| 7,532,975 B2 | 5/2009 | Ishikawa |
| 7,616,883 B2 | 11/2009 | Nakajima et al. |
| 7,742,083 B2 | 6/2010 | Fredlund et al. |
| 7,924,323 B2 | 4/2011 | Walker et al. |
| 7,995,109 B2 | 8/2011 | Kamada et al. |
| 8,063,952 B2 | 11/2011 | Kamada et al. |
| 8,243,156 B2 | 8/2012 | Sako |
| 2002/0039203 A1 | 4/2002 | Endo et al. |
| 2003/0151672 A1 | 8/2003 | Robins et al. |
| 2004/0061781 A1 | 4/2004 | Fennell et al. |
| 2004/0174434 A1 | 9/2004 | Walker et al. |
| 2004/0239776 A1 | 12/2004 | Shinohara et al. |
| 2005/0122405 A1 | 6/2005 | Voss et al. |
| 2006/0050982 A1 | 3/2006 | Grosvenor |
| 2006/0171694 A1 | 8/2006 | Kamimura et al. |
| 2006/0197845 A1 | 9/2006 | Masaki |
| 2007/0147814 A1* | 6/2007 | Nomura et al. ............. 396/55 |
| 2007/0206093 A1* | 9/2007 | Kuwabara et al. ........... 348/118 |
| 2007/0253696 A1 | 11/2007 | Nakajima et al. |
| 2007/0285533 A1 | 12/2007 | Furuya et al. |
| 2007/0291987 A1 | 12/2007 | Saka et al. |
| 2008/0192129 A1 | 8/2008 | Walker et al. |
| 2008/0316339 A1 | 12/2008 | Sugino et al. |
| 2009/0027513 A1 | 1/2009 | Sako |
| 2009/0051785 A1 | 2/2009 | Kamada et al. |
| 2009/0051788 A1 | 2/2009 | Kamada et al. |
| 2009/0278766 A1 | 11/2009 | Sako et al. |
| 2012/0026334 A1 | 2/2012 | Kamada et al. |

FOREIGN PATENT DOCUMENTS

| | | |
|---|---|---|
| JP | 07-107351 A | 4/1995 |
| JP | 08-279954 A | 10/1996 |
| JP | 10-150598 A | 6/1998 |
| JP | 2010-282536 | 10/1998 |
| JP | 2002-022463 A | 1/2002 |
| JP | 2002-034030 A | 1/2002 |
| JP | 2003-060972 A | 2/2003 |
| JP | 2004-212232 A | 7/2004 |
| JP | 2004-333921 A | 11/2004 |
| JP | 2005-276220 A | 10/2005 |
| JP | 2005-303492 A | 10/2005 |
| JP | 2005-348178 A | 12/2005 |
| JP | 2006-140695 A | 6/2006 |
| JP | 2006-251938 A | 9/2006 |
| JP | 2006-270561 A | 10/2006 |
| JP | 2007-057814 A | 3/2007 |
| JP | 2007-066251 A | 3/2007 |
| JP | 2007-109049 A | 4/2007 |
| JP | 2007-123953 A | 5/2007 |
| JP | 2007-150993 A | 6/2007 |
| JP | 2007-172035 A | 7/2007 |
| JP | 2007-206099 A | 8/2007 |
| WO | WO 90/08371 A1 | 7/1990 |

OTHER PUBLICATIONS

Yang et al., Smart Sight: A Tourist Assistant System. Proc 3rd Int'l Syposium on Wearable Computers, 1999, pp. 73-78 (retreived on Oct. 30, 2008 from http://isl.ira.uka.de/fileadmin/publicationfiles/ISWC99-jie.pdf.

* cited by examiner

AUTOMATIC IMAGE-CAPTURING APPARATUS, AUTOMATIC IMAGE-CAPTURING CONTROL METHOD, IMAGE DISPLAY SYSTEM, IMAGE DISPLAY METHOD, DISPLAY CONTROL APPARATUS, AND DISPLAY CONTROL METHOD

CROSS REFERENCES TO RELATED APPLICATIONS

This application is a divisional of and claims benefit under 35 U.S.C. §120 of U.S. patent application Ser. No. 12/263,665, titled "AUTOMATIC IMAGE-CAPTURING APPARATUS, AUTOMATIC IMAGE-CAPTURING CONTROL METHOD, IMAGE DISPLAY SYSTEM, IMAGE DISPLAY METHOD, DISPLAY CONTROL APPARATUS, AND DISPLAY CONTROL METHOD," filed on Nov. 3, 2008, which claims benefit under 35 U.S.C. §119 of Japanese Patent Application JP 2007-288335, filed in the Japanese Patent Office on Nov. 6, 2007. The entire contents of these applications are hereby incorporated by reference in their entireties.

BACKGROUND OF THE INVENTION

1. Field of the Invention

The present invention relates to an automatic image-capturing apparatus for automatically capturing an image of a subject, in particular, an automatic image-capturing apparatus to be worn by a user. Furthermore, the present invention relates to an image display system that is configured to include such an automatic image-capturing apparatus and an information processing apparatus and that automatically displays captured images and to an image display method for use therewith. In addition, the present invention relates to a display control apparatus for performing display control of automatically captured images and to a display control method for use therewith.

2. Description of the Related Art

For example, as a life-log camera, a camera for recording scenery that is viewed by a user in daily life as image data in such a manner that a camera worn by the user automatically performs periodic image capturing has been proposed. By using such a life-log camera, it is possible to keep his/her activity history and memories as image data.

More specifically, the life-log camera is worn by a user in such a manner that, for example, it is hung from the neck using a neck strap or it is integrally formed with an eyeglass unit. Then, in such a state, image capturing is performed, for example, at intervals of a fixed time period, and captured images are stored.

Examples of the related art include Japanese Unexamined Patent Application Publication No. 10-282536.

SUMMARY OF THE INVENTION

The object of automatically capturing and storing images using the life-log camera described above is to allow the user to confirm his/her activity history and to recall memories by reproducing and displaying stored images.

Here, in view of necessity for capturing an image of daily scenery at fixed intervals in the manner described above, it is assumed that a lot of captured images are to be stored in the life-log camera. As a consequence, for reproducing stored images, a usage is conceived in which, unlike a case in which images captured by a normal camera device (a camera device for receiving captured images by a shutter operation (including self-timer image capturing) of a user or the like are to be reproduced and displayed, stored images are advanced and displayed at a comparatively high speed (in a riffled manner).

However, since a life-log camera is made to capture an image in a state in which it is worn by a user, there is a problem in that the inclination of the apparatus main unit varies greatly due to the user walking or carrying out an action. As a consequence, there is a problem in that the inclination regarding the content of the captured image may vary greatly.

In a case where a comparatively large variation in inclination occurs, in the case that stored images are advanced and reproduced in the manner described above, a phenomenon in which reproduced images swing unnaturally occurs. In particular, with regard to captured images by a life-log camera, comparatively high-speed sending and reproduction are performed in the manner described above. As a result, when swinging of a reproduced image as a consequence of image inclination occurs, the probability of making a user having the images feel uncomfortable is increased.

It is desirable to reduce the occurrence of swinging of a reproduced image, which may occur during the reproduction (during the display) of image data captured by an automatic image-capturing apparatus that automatically captures an image of a subject.

In particular, it is desirable to reduce swinging of a reproduced image, which is caused by an inclination in the pan direction (for example, in the horizontal axis direction of the image) or in the tilt direction (for example, in the vertical axis direction of the image), which occurs when image capturing is performed.

According to an embodiment of the present invention, there is provided an automatic image-capturing apparatus configured as described below.

That is, the automatic image-capturing apparatus includes image-capturing means for capturing an image of a subject so as to obtain captured image data, and automatic captured-image obtaining means for automatically obtaining the captured image data obtained by the image-capturing means without being based on the operation of a user.

Furthermore, the automatic image-capturing apparatus includes inclination detection means for detecting an inclination toward at least one of a pan direction and a tilt direction.

Furthermore, the automatic image-capturing apparatus includes control means for controlling the obtaining operation by the automatic captured-image obtaining means on the basis of information on the inclination in the pan direction or in the tilt direction, which is detected by the inclination detection means.

Furthermore, in an embodiment of the present invention, the automatic image-capturing apparatus is configured as described below.

That is, the automatic image-capturing apparatus includes image-capturing means for capturing an image of a subject so as to obtain captured image data, and automatic captured-image obtaining means for automatically obtaining the captured image data obtained by the image-capturing means without being based on the operation of a user, and inclination detection means for detecting an inclination in at least one of a pan direction and a tilt direction.

Also, the automatic image-capturing apparatus includes control means for performing control so that the information on the inclination in the pan direction or in the tilt direction, which is detected by the inclination detection means, is associated with the captured image data obtained by the automatic captured-image obtaining means.

According to another embodiment of the present invention, there is provided an image display system configured to include an automatic image-capturing apparatus for automatically capturing an image of a subject and an information processing apparatus configured to perform data communication with the automatic image-capturing apparatus.

That is, the automatic image-capturing apparatus may include image-capturing means for capturing an image of a subject so as to obtain captured image data; automatic captured-image obtaining means for automatically obtaining the captured image data obtained by the image-capturing means without being based on an operation of a user; and inclination detection means for detecting an inclination in at least one of a pan direction and a tilt direction.

Furthermore, the automatic image-capturing apparatus may include image-capturing-apparatus-side control means for performing control so that the information on the inclination in the pan direction or in the tilt direction, which is detected by the inclination detection means, is associated with the captured image data obtained by the automatic captured-image obtaining means.

The information processing apparatus may include display means for performing image display, and information-processing-apparatus-side control means.

The information-processing-apparatus-side control means may perform an obtaining process for obtaining the captured image data that is captured on the automatic image-capturing apparatus side and with which the information on the inclination is associated, a determination process for determining whether or not the inclination of the captured image data is within a predetermined range on the basis of the information on the inclination associated with the captured image data obtained by the obtaining process, and a display control process for performing control so that captured image data in which the inclination has been determined to be within the predetermined range on the basis of the determination result by the determination process is displayed on the display means.

According to another embodiment of the present invention, there is provided a display control apparatus configured as described below.

That is, the display control apparatus according to the embodiment of the present invention is a display control apparatus for performing display control of automatically captured images with which information on the inclination in the pan direction or in the tilt direction is associated, and includes control means for performing the following processing.

That is, the control means may perform a determination process for determining whether or not the inclination of the captured image data is within a predetermined range on the basis of the information on the inclination associated with the captured image data as the automatically captured image; and a display control process for performing control so that the captured image data in which the inclination has been determined to be within the predetermined range on the basis of the determination result by the determination process is displayed on necessary display means.

As described above, the automatic image-capturing apparatus (automatic image-capturing control method) according to the embodiment of the present invention controls the operation for obtaining captured image data on the basis of the result in which the inclination in the pan direction or the tilt direction is detected.

Alternatively, the automatic image-capturing apparatus causes the information on the detected inclination in the pan direction or toward the tilt direction to be associated with the captured image data obtained by automatic image capturing.

Furthermore, the image display system (image display method) and the display control apparatus (display control method) according to embodiments of the present invention performs control so that information on the inclination in the pan direction or in the tilt direction is associated with captured image data that is obtained by automatic image capturing and thereafter, during image reproduction, captured image data in which the inclination is within a predetermined range is displayed on the basis of the information on the associated inclination.

According to the embodiments of the present invention, the obtaining of captured image data that is automatically captured by an automatic image-capturing apparatus for which use in a state of being installed in a user, such as, for example, a life-log camera, is conceived, is controlled on the basis of the information on the detected inclination in the pan direction or in the tilt direction, or the display thereof is controlled on the basis of the information on the inclination in the pan direction or in the tilt direction, thereby making it possible to reproduce and display only the captured image data in which the inclination is within a predetermined range.

If only the captured image data in which the inclination is within a predetermined range can be reproduced and displayed in the manner described above, it is possible to reduce swinging of a reproduced image, which occurs when automatically captured image data is reproduced. As a result, it is possible to prevent occurrence of a situation in which a user is given an uncomfortable feeling as in the related art.

According to the automatic image-capturing apparatus (automatic image-capturing control method) that causes information on the detected inclination to be associated with captured image data that is obtained by, in particular, automatic image capturing and the image display system (image display method) according to the embodiments of the present invention, unlike the case of controlling the reception of an automatically captured image, it is possible to obtain all captured image data obtained at an automatic image capturing timing. That is, for example, whereas, during sending reproduction, display control based on information on an inclination associated to reduce swinging of a reproduced image is performed, display of another captured image data can be performed as necessary.

DESCRIPTION OF THE PREFERRED EMBODIMENTS

Embodiments of the present invention will be described below. The description will be given in the following order.

1. First Embodiment (obtaining control: example in which two-axis gyro sensor is used)

2. Second Embodiment (obtaining control: example in which direction sensor is used to detect pan direction)

3. Third Embodiment (obtaining control: example in which reference inclination in pan direction is set as traveling direction)

4. Fourth Embodiment (display control: example in which average value and traveling direction are calculated in real time)

5. Fifth Embodiment (display control: example in which average value and traveling direction are calculated in an ex-post manner during reproduction)

6. Modification

First Embodiment
Example of Exterior of Automatic Image-Capturing Apparatus

Figure 1A:
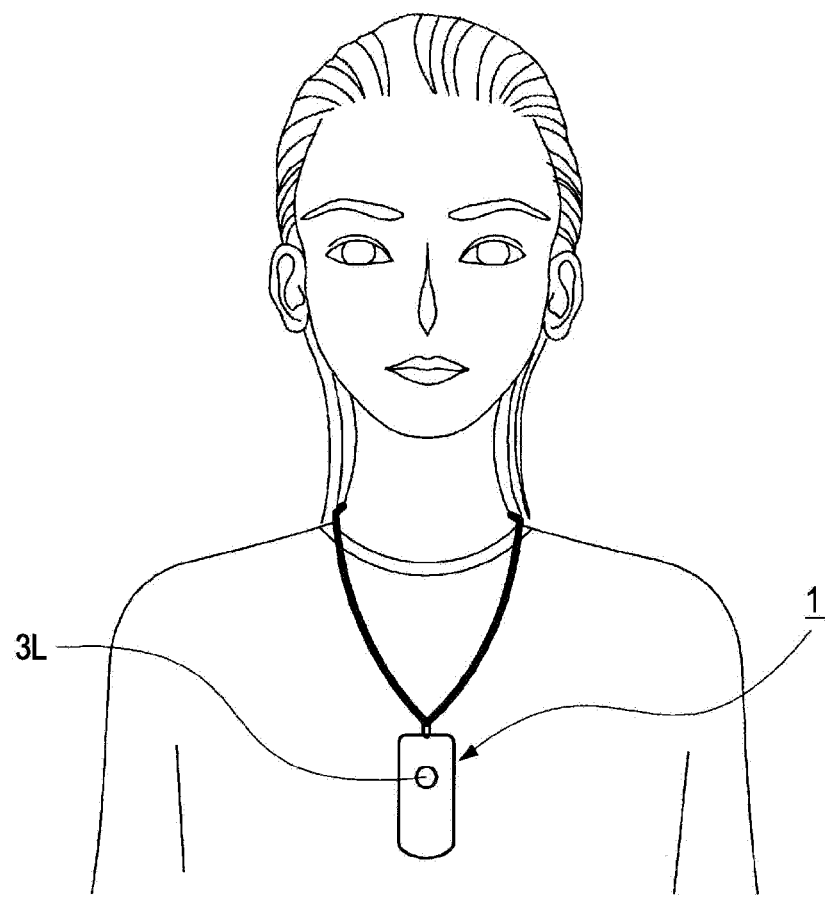
FIGS. 1A and 1B are exterior views of an automatic image-capturing apparatus according to an embodiment of the present invention.
Figure 1B:
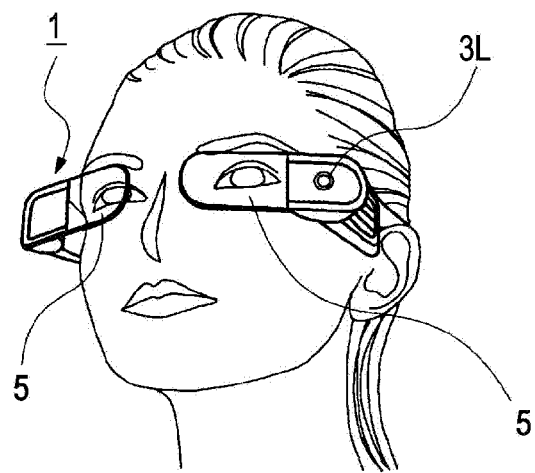

FIGS. 1A and 1B show examples of the exterior of an image-capturing apparatus 1 as an embodiment of the present invention.

FIG. 1A shows an example of the exterior of the image-capturing apparatus 1 of a neck-strap type. The image-capturing apparatus 1 in this case has a part with which, for example, a strap is attached, and is mounted in such a manner that the strap is attached in that part and is hung around a user's neck as shown in the figure. The user may wear it so that an image-capturing lens 3L provided in the image-capturing apparatus 1 can perform image capturing by assuming toward the front of the user to be a subject direction.

Although not shown in the figure, in this case, for example, a display unit (display unit 5 (to be described later)) used to monitor and reproduce captured images is provided in the back part of the image-capturing apparatus 1.

FIG. 1B shows an example the exterior of the image-capturing apparatus 1 that is formed as an eyeglass-type display camera. The image-capturing apparatus 1 in this case has, for example, a mounting unit of a frame structure that half-circles from both-side head part toward the back head part, and is attached to the user as a result of being hung around both auricles, as shown in the figure.

In the image-capturing apparatus 1 in this case, in a state in which the user has worn the image-capturing apparatus 1, the image-capturing lens 3L is arranged toward the front in such a manner that image capturing is performed by assuming the field-of-view direction of the user to be a subject direction.

Furthermore, in the worn state shown in the figure, a pair of display units 5 and 5 for the left eye and the right eye are arranged immediately before both eyes of the user, that is, at a place where the lenses in normal eyeglasses are positioned. For the display units 5 in this case, for example, a liquid-crystal panel is used, and by controlling transmittance, a through state shown in the figure, that is, a transparent or semi-transparent state can be formed. As a result of the display units 5 being made to be a through state, even if the user wears the image-capturing apparatus 1 like eyeglasses at all times, no problem is posed in ordinary life.

A pair of display units 5 are provided so as to correspond to both eyes and also, one display unit 5 may be provided so as to correspond to one eye. In addition, the display units 5 may not be provided.

In FIGS. 1A and 1B, the neck-hanging type or eyeglass-type image-capturing apparatus 1 has been shown. Various configurations for the user to wear the image-capturing apparatus 1 are also possible. Any type of mounting unit, such as, for example, a headphone-type, neck-band-type, behind-the-ear type, or hat type may be worn by the user. In addition, a form may also be possible in which the image-capturing apparatus 1 is worn by the user in such a manner that the image-capturing apparatus 1 is mounted in ordinary eyeglasses, a visor, a headphone, or the like by using fixture such as a clip.

Furthermore, the image-capturing apparatus 1 may not necessarily be mounted in the head part of the user.

In the case of FIG. 1A, the image-capturing direction is set as being toward the front of the user. Alternatively, the image-capturing apparatus 1 may also be worn in such a manner as to be hung around the neck so that image capturing is performed for the area behind the user when it is worn.

Then, in the case of FIG. 1B, the image-capturing direction is set as a field-of-view direction. In addition, a configuration in which the image-capturing lens 3L is mounted so that image capturing of an area behind the user, an area at a side of the user, an area above the user, an area in a downward direction toward the feet, and the like when the image-capturing apparatus 1 is worn, and a configuration in which a plurality of image-capturing systems whose image-capturing directions are the same or different are provided are possible.

Furthermore, in FIGS. 1A and 1B, an image-capturing direction varying mechanism with which the subject direction can be varied manually or automatically may be provided for one or a plurality of image-capturing lenses 3L.

As an image-capturing apparatus for performing moving or still image capturing, of course, forms other than those shown in FIGS. 1A and 1B are possible. For example, a device, an example of which is a mobile phone, a PDA (Personal Digital Assistant), or a portable personal computer, and which is provided with a function of an image-capturing apparatus, can be conceived as the image-capturing apparatus 1 of the present embodiment.

Furthermore, in the above various forms, for example, a microphone for collecting outside sound may be provided, so that an audio signal that is recorded together with image data can be obtained. Furthermore, a speaker unit and an earphone unit for performing audio output may also be formed.

Furthermore, a light-emitting unit for performing illumination in the subject direction in the form of, for example, a light-emitting diode (LED), may be provided in the vicinity of the image-capturing lens 3L, or a flash light-emitting unit for performing still image capturing may be provided.

Example of Interior Configuration of Automatic Image-Capturing Apparatus

Figure 2:
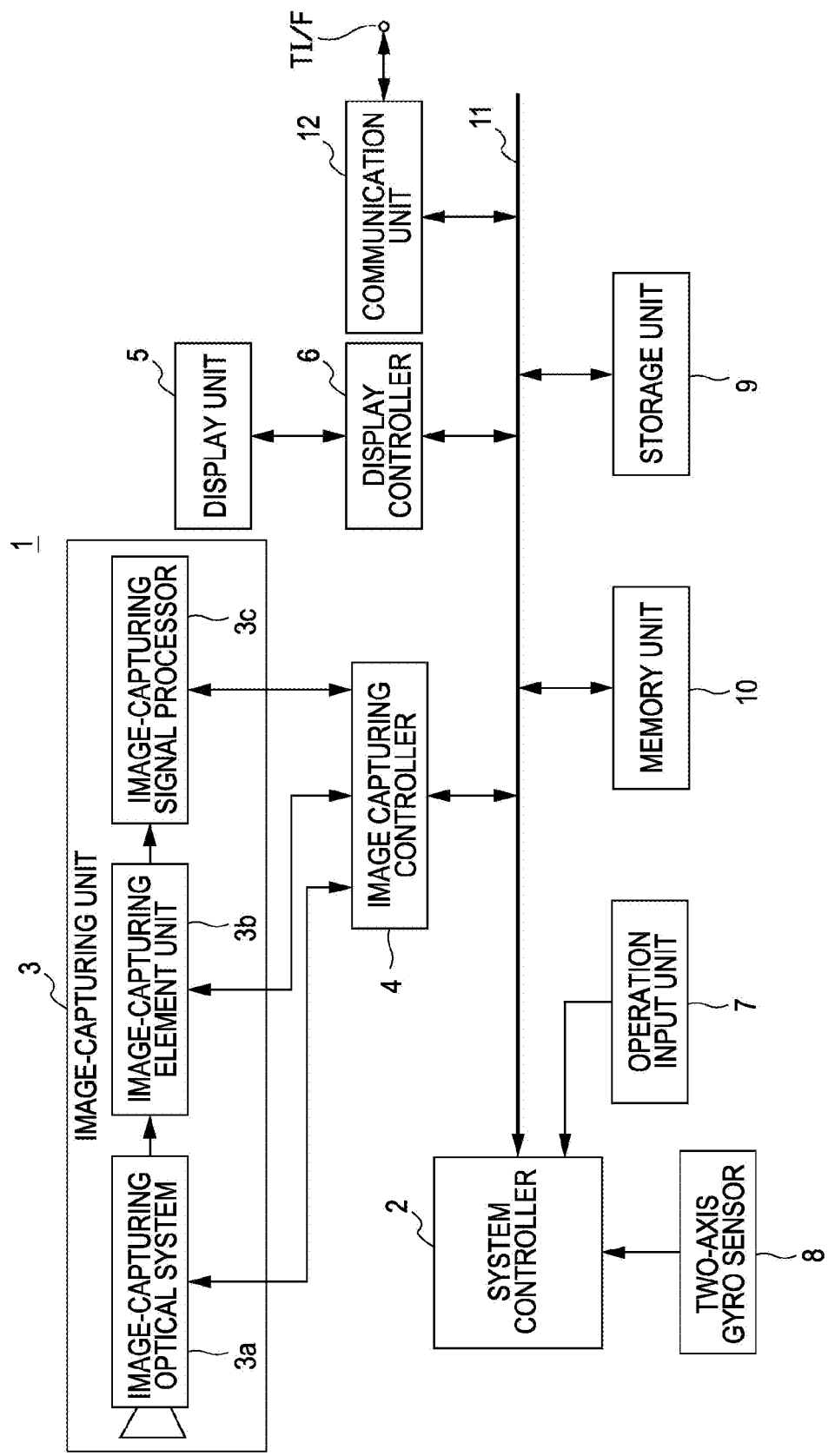
FIG. 2 is a block diagram showing the internal configuration of an automatic image-capturing apparatus according to a first embodiment of the present invention.

FIG. 2 is a block diagram showing the internal configuration of the image-capturing apparatus 1 as a first embodiment of the present invention.

As shown in the figure, the image-capturing apparatus 1 includes a system controller 2, an image-capturing unit 3, an image-capturing controller 4, a display unit 5, a display controller 6, an operation input unit 7, a two-axis gyro sensor 8, a storage unit 9, a memory unit 10, a bus 11, and a communication unit 12.

The system controller 2 is formed by a microcomputer including, for example, a central processing unit (CPU), a read-only memory (ROM), a random access memory (RAM), a non-volatile memory unit, and an interface unit, and serves as a controller for controlling the entire image-capturing apparatus 1. The system controller 2 performs various kinds of computation processes and transmission and reception of a control signal with each unit via the bus 11 in accordance with a program stored in the internal ROM or the like, and causes each unit to perform a necessary operation.

The image-capturing unit 3 includes an image-capturing optical system 3a, an image-capturing element unit 3b, and an image-capturing signal processor 3c.

The image-capturing optical system 3a in the image-capturing unit 3 is provided with a lens system including the image-capturing lens 3L shown in FIG. 1, an aperture, a zoom lens, a focus lens, and the like; and a driving system for causing the lens system to perform a focus operation and a zoom operation.

In the image-capturing element unit 3b in the image-capturing unit 3, a solid-state image-capturing element array for detecting image-capturing light obtained by the image-capturing optical system 3a and for generating an image-capturing signal by performing photoelectric conversion thereon is provided. The solid-state image-capturing element array is formed as, for example, a charge-coupled device (CCD) sensor array or a complementary metal-oxide semiconductor (CMOS) sensor array.

The image-capturing signal processor 3c in the image-capturing unit 3 includes a sample-hold/automatic-gain-control (AGC) circuit for performing gain adjustment and waveform shaping on a signal obtained by solid-state image-capturing elements, and a video A/D converter, and obtains captured image data as digital data. Furthermore, a white-balance process, a luminance process, a color signal process, and the like are performed on the captured image data.

Image capturing is performed by the image-capturing unit 3 having the image-capturing optical system 3a, the image-capturing element unit 3b, and the image-capturing signal processor 3c, and captured image data is obtained.

The image data obtained by the image-capturing operation of the image-capturing unit 3 is processed by the image-capturing controller 4.

Under the control of the system controller 2, the image-capturing controller 4 performs processing, such as an image compression process for compressing captured image data at various compression ratios, an image size conversion process, and an image format conversion process, and also performs a process for transferring captured image data to each unit (display controller 6, storage unit 9, memory unit 10, and communication unit 12, etc.) connected via a bus 11 according to the operation status.

On the basis of the instruction of the system controller 2, the image-capturing controller 4 performs on/off control of an image-capturing operation in the image-capturing unit 3, a shutter process, driving control of a zoom lens and a focus lens of the image-capturing optical system 3a, control of the sensitivity and the frame rate of the image-capturing element unit 3b, parameter control of each process of the image-capturing signal processor 3c, and setting of execution processes.

For the configuration for performing display to a user in the image-capturing apparatus 1, a display unit 5 and a display controller 6 are provided.

The display unit 5 is provided with a display panel unit, such as a liquid-crystal display, and a display driving unit for driving the liquid-crystal display unit. The display drive unit is formed of a pixel driving circuit for performing image display unit. The pixel driving circuit applies, at a predetermined horizontal/vertical driving timing, a driving signal based on a video signal to each of pixels arranged in a matrix in the display panel unit, so that display is performed.

Under the control of the system controller 2, the display controller 6 drives the pixel driving circuit in the display unit 5 so as to perform predetermined display. For example, real-time monitor display of images captured by the image-capturing unit 3, display of a reproduced image regarding captured image data recorded in the storage unit 9, and the like, are performed.

In order to perform these displays, for example, luminance level adjustment, color correction, contrast adjustment, sharpness (contour enhancement) adjustment, and the like can be performed. Furthermore, generation of an expanded image such that part of image data is expanded or generation of a reduced image, image effect processes, such as soft focus, mosaic, luminance inversion, highlight display (enhancement display) of part of an image, changing of atmosphere of the color of the whole, and the like can be performed.

The operation input unit 7 has operation elements such as, for example, keys, buttons, and dials. For example, operation elements used in power-supply on/off operation and operation related to automatic image capturing are formed. Furthermore, when image capturing in accordance with shutter operation of a user is to be enabled in addition to automatic image capturing, operation elements used in, for example, shutter operation, zoom operation, exposure setting operation, self-timer image-capturing operation, and the like as user operation related to image capturing may be formed.

The operation input unit 7 supplies information obtained from such operation elements to the system controller 2, and the system controller 2 performs necessary computation processes and control corresponding to these items of information.

The storage unit 9 is used to store various kinds of data, including captured image data.

This storage unit 9 may be formed of a solid-state memory such as a flash memory, and may also be formed of, for example, a hard disk drive (HDD).

The storage unit 8, rather than being formed as an incorporated recording medium, may also be formed as a recording and reproduction drive compatible with a portable recording medium, for example, a memory card in which a solid-state memory is contained, an optical disc such as a compact disc (CD) or a digital versatile disc (DVD), a magneto-optical disc, a hologram memory, or the like.

Of course, both a built-in type memory, such as a solid-state memory or an HDD, and a recording and reproduction drive for a portable recording medium may be installed.

Under the control of the system controller 2, the storage unit 9 records and reproduces the captured image data and other various kinds of data.

The memory unit 10 is provided to temporarily store various kinds of data, and is formed of a data rewritable memory device, such as, for example, a RAM or a non-volatile memory. For example, the memory unit 10 can be used as a temporary storage area (work area with which image signal processing is performed) for captured image data for which various image signal processing are performed.

The communication unit 9 is provided as a unit for performing data communication with various kinds of external devices. For example, transmission and reception of data may be performed with a server apparatus (not shown). In that case, for example, network communication may be performed via a short-distance wireless communication with respect to a network access point by using a method, such as, for example, a wireless LAN or Bluetooth or, for example, wireless communication may be performed directly with a server apparatus having a compliant communication function.

Furthermore, the communication unit 12 may be connected to a device, such as a personal computer, by using an interface, such as, for example, a universal serial bus (USB) method, so that transmission and reception of data is performed.

The communication unit 12 enables, for example, captured image data that is captured and stored in the storage unit 9 to be transferred to a personal computer or other external devices.

Here, as an example, the communication unit 12 is assumed to be capable of performing data communication with external devices by using a wired connection interface, such as, for example, a USB method. In the figure, an interface terminal TI/F is a terminal to which a communication cable for connection with the external device side is connected when performing data communication through such wired connection.

The two-axis gyro sensor 8 is provided to detect the inclination of the image-capturing apparatus 1 in the pan direction and in the tilt direction.

In this case, the two-axis gyro sensor 8 is disposed inside the image-capturing apparatus 1 in such a manner that one of the detection axis directions thereof matches the horizontal direction of the image-capturing element (captured image) and the other detection axis direction matches the vertical direction of the image-capturing element. As a result, the inclination (rotational axis speed) in the pan direction (horizontal direction: side-to-side direction) and the inclination in the tilt direction (vertical direction: up-and-down direction) are detected.

Detection signals indicating the inclinations in the pan direction and in the tilt direction, which are obtained by the two-axis gyro sensor 8, are supplied to the system controller 2.

The configuration of the image-capturing apparatus 1 of the embodiment is not limited to the configuration described with reference to FIG. 2, and of course, additions and deletions of various components may be made according to operation examples and functions performed in practice.

Control of Obtaining Automatically Captured Image in Accordance with Inclination of Pan and Tilt The image-capturing apparatus 1 shown in FIG. 2 performs, as an automatic image capturing function, an operation for automatically obtaining captured image data based on a captured image obtained by the image-capturing unit 3. More specifically, on the basis of an automatic image capturing timing set, for example, every fixed time period, the system controller 2 gives instructions for the image-capturing controller 4 and performs control of obtaining captured image data. At this time, on the basis of the automatic image capturing timing, the system controller 2 performs control so that compressed image data based on the captured image data obtained by the image-capturing unit 3 is generated by the image-capturing controller 4, and the compressed image data is recorded in the storage unit 9.

Here, as can be understood from the description thus far, the image-capturing apparatus 1 of the present embodiment is assumed to automatically capture an image of a subject in a state in which the image-capturing apparatus 1 is worn by the user. It is assumed that the automatic image-capturing apparatus formed to be such a wearable type as a life-log camera described earlier is used for the user to keep his/her activity history and memories as image data.

However, when the automatic image-capturing apparatus is assumed to be used as such a life-log camera, as described earlier, there is a high probability that large variations in the inclination occur in the automatically captured-image data as a consequence of the user moving (that is, the person carrying the camera), and when the captured image is advanced and reproduced (displayed), a problem arises in that the reproduced image swings unnaturally. In particular, regarding a captured image by a life-log camera, since comparatively high-speed sending and reproduction is assumed to be performed as described above, such swinging of a reproduced image has a high probability of making a user feel uncomfortable.

At this point, what should be noted is that an inclination that occurs in image data in the pan direction and in the tilt direction is very difficult to correct. That is, regarding an inclination (inclination that occurs with the center of the image being a rotational axis) that occurs in the plane direction of image data, it is possible to correct the inclination by cutting out an image at an appropriate angle by, for example, trimming. However, when an inclination occurs in the pan direction and in the tilt direction, the captured image is no longer such that the subject is captured from the front, and therefore, it is very difficult to perform appropriate correction. In particular, when a comparatively large inclination occurs, a subject to be displayed temporarily moves outside the image frame, with the result that there is a high possibility that an image (that is, a failed image) in which the subject being captured is not recognizable is obtained.

Accordingly, in the present embodiment, during reproduction, by not displaying captured image data for which a comparatively large inclination has occurred in the pan direction and in the tilt direction, reduction in the swinging of the reproduced image and also prevention of mixed-in of a failed image are achieved.

In the first embodiment, the operation of obtaining an automatically captured image is controlled on the basis of the detection signal by the two-axis gyro sensor 8, thereby not reproducing or displaying an image in which a comparatively large inclination has occurred in the pan direction and in the tilt direction in the manner described above.

Figure 3:
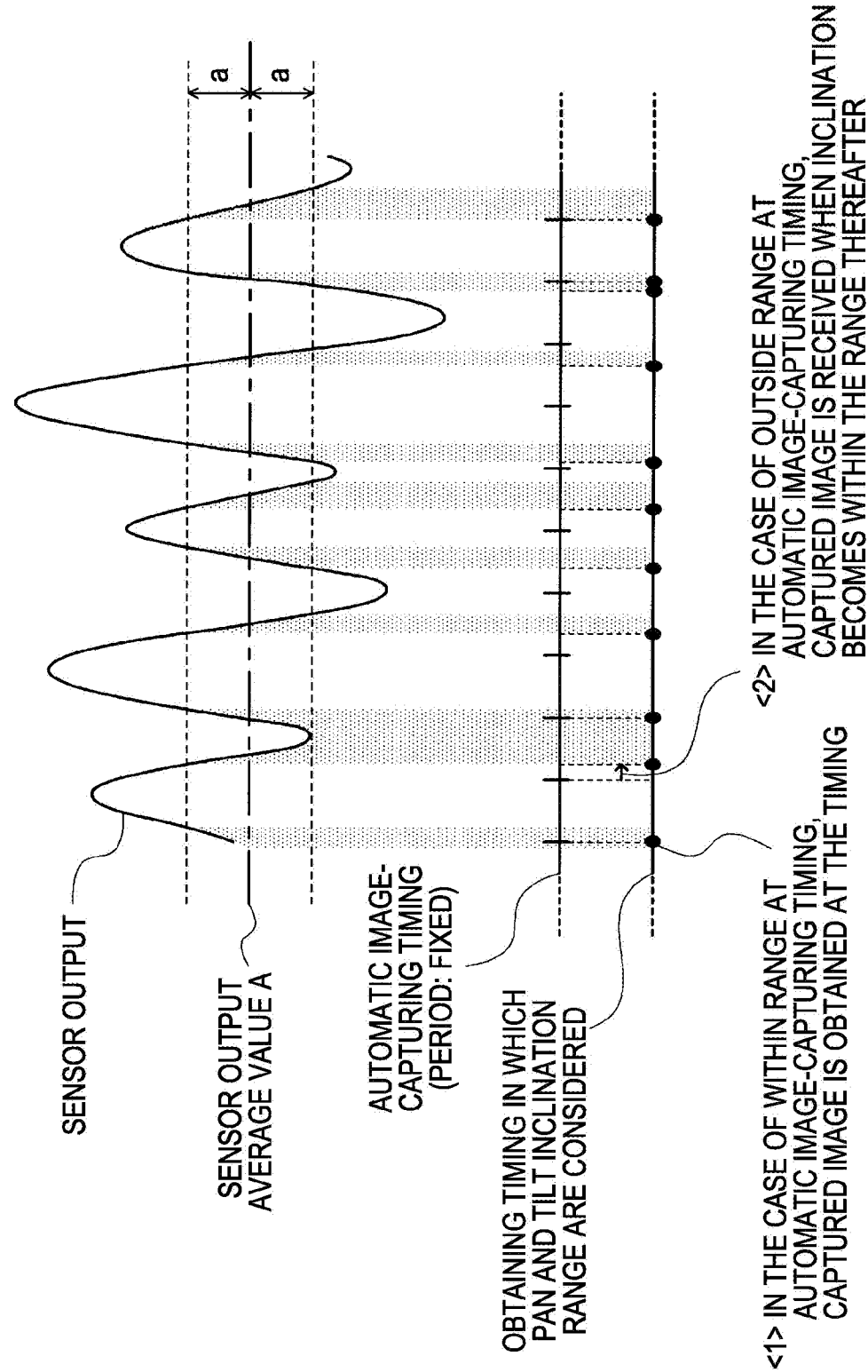
FIG. 3 illustrates an operation as the embodiment.

FIG. 3 illustrates the operation of the first embodiment of the present invention.

In FIG. 3, sensor output in the figure indicates an output signal by the two-axis gyro sensor 8. Here, only a detection signal for one of the pan direction and the tilt direction is shown as an example. Furthermore, the automatic image capturing timing in the figure is a timing at a fixed period, such as, for example, at intervals of 10 or 5 seconds, which is set in advance as an automatic image capturing period.

First, in this case, for obtaining captured image data, basically, an automatic image capturing timing takes priority. The obtaining of a captured image in this case is basically performed in a case where the result of a determination of whether or not the inclination is within a predetermined range for each automatic image capturing timing in the figure indicates that the inclination is within the predetermined range (<1> in the figure).

In this case, when it is determined that the inclination is not within the predetermined range at an automatic image capturing timing, monitoring of sensor output is started, and thereafter, the captured image data at the time the inclination becomes within the predetermined range is obtained (<2> in the figure).

Here, in the present embodiment, when it is to be determined whether or not the inclination is within the predetermined range, the average value A of sensor outputs is calculated.

That is, when the magnitude of the inclination is to be determined, it is necessary to define a direction (that is, a direction in which the user is directed) serving as a reference. Here, the direction in which the front of the image-capturing apparatus 1 is directed in a state in which such average value A of the sensor outputs has been obtained is assumed to match the direction in which the user is directed, and the magnitude of the inclination is determined from the sensor outputs by using the average value A as a reference.

More specifically, when the calculation of the average value A is to be performed, the system controller 2 holds the values of sensor outputs obtained for the past several points in time. Then, on the basis of a plurality of sensor output values that are held in this manner and the sensor output value that is obtained at the current time, an average value of the sensor outputs is calculated. That is, as a result, the average value A (the average value A of the inclinations) of sensor outputs for the past predetermined period in which the current time is used as a reference is calculated.

Then, on the basis of the sensor output average value A that is calculated in this manner and a preset threshold value a, it is determined whether or not the current inclination value is within a predetermined range defined using the value of the threshold value a. More specifically, it is determined whether or not the sensor output value obtained from the two-axis gyro sensor 8 is within the range of ±a in which the average value A is used as a reference.

Here, in FIG. 3, for convenience of description, the captured image obtaining control is described as being performed in accordance with the determination result based on the sensor output of one of the pan direction and the tilt direction. In practice, however, an average value A is calculated with respect to sensor outputs of both the pan direction and the tilt direction in a similar manner. When it is determined that the inclination is within the predetermined range in both directions on the basis of the result in which the same determination is performed on the basis of the average value A and the threshold value a, control is performed so that captured image data is obtained.

As a result of performing captured image obtaining control based on such sensor outputs and the average value A thereof, in the image-capturing apparatus 1, as automatically captured images, only images in which the inclinations in the pan direction and in the tilt direction are within the predetermined range can be obtained. That is, as a result, during reproduction, only images in which the inclinations in the pan direction and in the tilt direction are within the predetermined range can be reproduced and displayed, making it possible to reduce the swinging of a reproduced image.

As a result of the swinging of the reproduced image being reduced, it is possible to prevent the occurrence of a situation in which a user is made to feel an uncomfortable as in the related art.

Processing Operation

Figure 4:
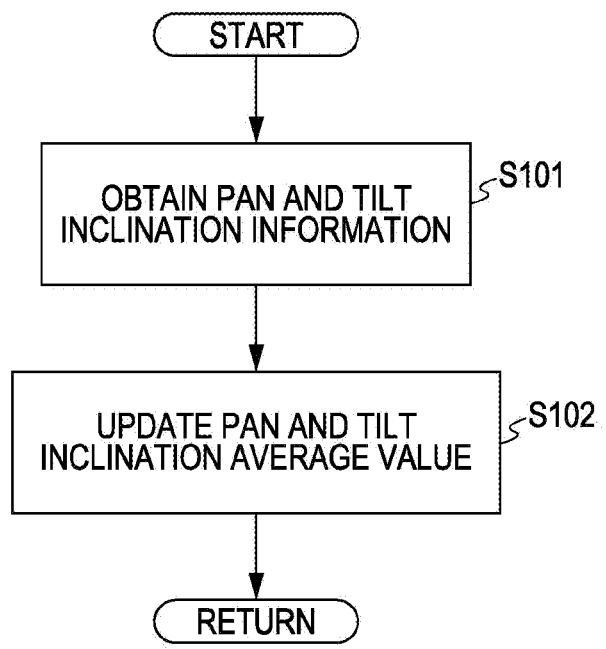
FIG. 4 is a flowchart showing a processing operation for calculating an average value of inclinations as processing operation that should be performed to implement operation as the first embodiment of the present invention.
Figure 5:
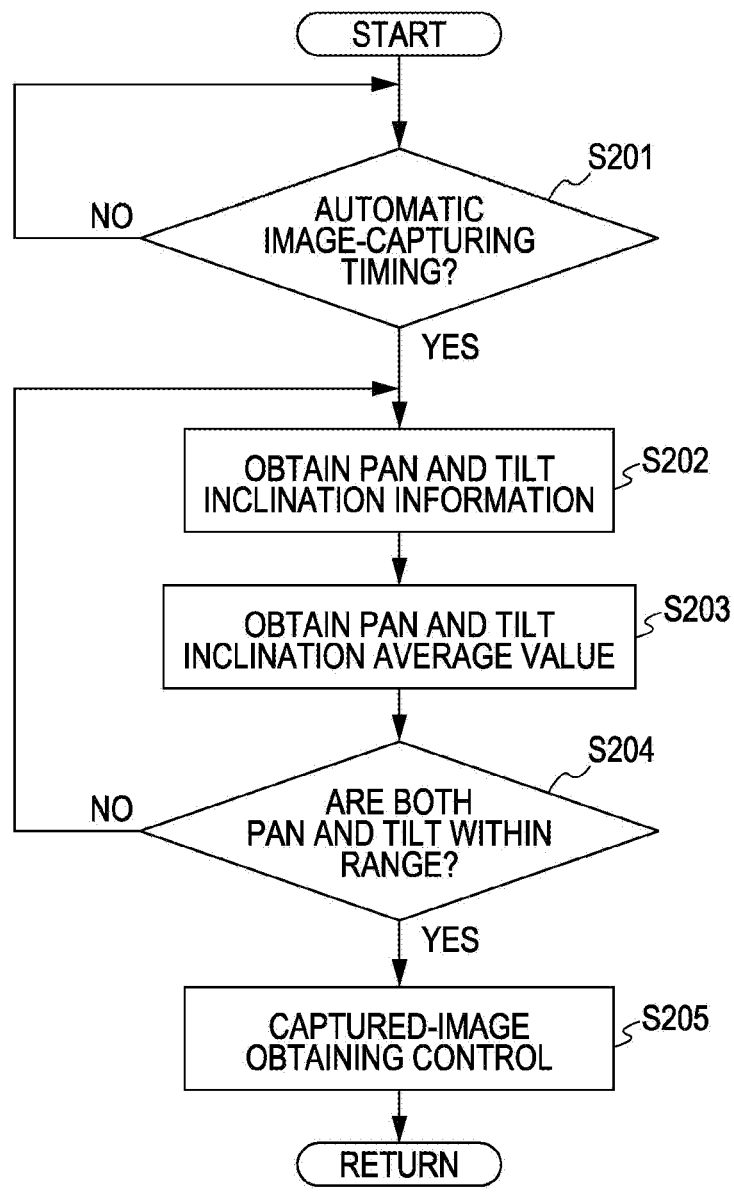
FIG. 5 is a flowchart showing a processing operation for performing image capturing control on the basis of the determination result of inclinations in pan and tilt directions as processing operation that should be performed to implement operation as the first embodiment of the present invention.

A description will be given below, with reference to the flowcharts of FIGS. 4 and 5, of processing operation that should be performed to implement operation as the first embodiment described in the foregoing. FIG. 4 shows processing operation that should be performed to calculate an average value A of inclinations. FIG. 5 shows processing operation that should be performed to perform control of obtaining a captured image on the basis of the average value A.

Processing operations shown in FIGS. 4 and 5 are performed by the system controller 2 in accordance with, for example, a program stored in the internal ROM. Furthermore, the system controller 2 is assumed to perform processing operations shown in FIGS. 4 and 5 in parallel.

Processing operation shown in FIG. 4 will be described first.

In FIG. 4, in step S101, the pan and tilt inclination information is obtained. That is, the values of the detection signals for both the pan direction and the tilt direction, which are supplied from the two-axis gyro sensor 8, are obtained, and these values are stored in, for example, an internal non-volatile memory or the like.

In the subsequent step S102, the pan and tilt inclination average value is updated. That is, an average value of the values obtained and held within predetermined period in which the current time is used as a reference among the values of the detection signals obtained and held in the past by the process of step S101, and the values of the detection signals obtained in step S101 at the current time is calculated with respect to each of the pan direction and the tilt direction. Then, using each of the average values calculated in the manner described above, the value of the average value A (denoted as Ap) of the inclination in the pan direction and the value of the average value A (denoted as At) in the tilt direction at the current time are each updated.

When the process of step S102 is performed, as shown in the figure, "RETURN" is reached.

Next, a description will be given of processing operation shown in FIG. 5.

In FIG. 5, first, in step S201, a process for waiting for an automatic image capturing timing is performed. That is, operation waits until the automatic image capturing timing that is determined in advance, at which the captured image data obtained by the image-capturing unit 3 should be obtained, is reached.

Then, when the automatic image capturing timing is reached, in step S202, a process for obtaining pan and tilt inclination information is performed.

In the next step S203, a process for obtaining average values of pan and tilt inclinations is performed. That is, the information on the average value Ap of the inclinations in the pan direction and the information on the average value At of the inclinations in the tilt direction at the current time, which are successively updated by the processing operation shown in FIG. 4 described above, are obtained.

In the subsequent step S204, it is determined whether or not the inclination is within the range with respect to both the pan and tilt directions. That is, with respect to the pan direction, it is determined whether or not the value of the inclination in the pan direction obtained in step S202 is within the range of an average value Ap±a. with respect to the tilt direction, it is determined whether or not the value of the inclination in the tilt direction, which is obtained in step S202, is within the range of the average value At±a.

When an affirmative result is obtained in step S204 by determining that both pan and tilt are within the range because the inclinations in the pan direction and the tilt directions are within the range in which the average values Ap and At are used as references, respectively, the process proceeds to step S205, where a process for controlling obtaining of a captured image is performed. Instructions are given to the image-capturing controller 4, so that control is performed in such a manner that compressed image data of the captured image data obtained by image-capturing unit 3 is generated and the compressed image data is recorded in the storage unit 9.

When the obtaining control process in step S205 is performed, "RETURN" is reached as shown in the figure.

On the other hand, when, in step S204, a negative result is obtained by determining that at least one of inclinations of the pan direction and the tilt directions is not within the range in which the average value A is used as a reference, and both pan and tilt are not within the range, the process returns to step S202, as shown in the figure. That is, as a result, hereinafter, obtaining of inclination information→obtaining of an average value A→determination of whether or not the inclination is within the range are repeated until both pan and tilt are within the range. As a result, when the inclination is not within the predetermined range at the automatic image capturing timing, captured image data at the time the inclination becomes within the predetermined range thereafter is obtained.

Although a description using the drawings is omitted, examples of the processing operations shown in FIGS. 4 and 5 include operation input of switching off the power supply of the image-capturing apparatus 1 and operation input for instructing the stopping of an automatic image capturing operation, which are completed in response to a generation of a stop trigger that is set in advance to stop the automatic image capturing operation. More specifically, the system controller 2 performs processing operations shown in these figures, and the above-described processing operation for waiting for a stop trigger to be generated as processing operation that should be performed in parallel, and completes the processing operations shown in FIGS. 4 and 5 in response to the generation of the stop trigger.

This point is common to all the processing operations of the system controller 2 described with reference to each of the following embodiments.

Second Embodiment

Next, a second embodiment of the present invention will be described. In the second embodiment, for means for detecting an inclination in the pan direction, a direction sensor is used.

Figure 6:
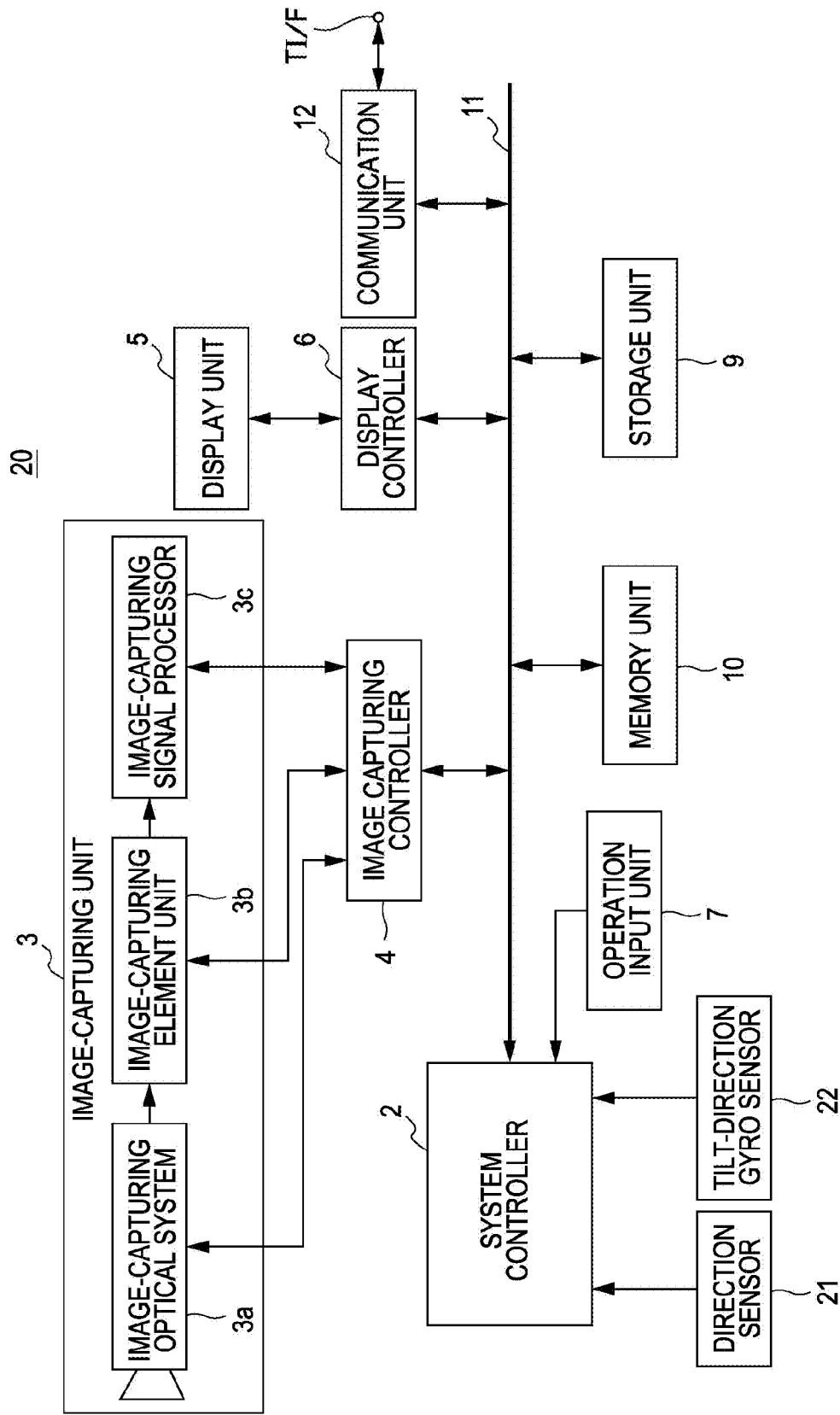
FIG. 6 is a block diagram showing the internal configuration of an automatic image-capturing apparatus according to a second embodiment of the present invention.

FIG. 6 shows the internal configuration of an image-capturing apparatus 20 according to a second embodiment of the present invention.

The exterior of the image-capturing apparatus described in each of the following embodiments, including the second embodiment, is identical to that described with reference to FIG. 1 above, and accordingly, a repeated description is omitted. Regarding the internal components, those that have already been described are designated with the same reference numerals, and descriptions thereof are omitted.

As shown in FIG. 6, in the image-capturing apparatus 20 of the second embodiment, the two-axis gyro sensor 8 provided in the image-capturing apparatus 1 shown in FIG. 2 is omitted. A direction sensor 21 detects an inclination in the pan direction, and a gyro sensor (tilt-direction gyro sensor) 22 detects an inclination in the tilt direction. In this case, the tilt-direction gyro sensor 22 is provided in the image-capturing apparatus 20 in such a manner that the detection axis direction thereof matches the vertical direction of the image-capturing element.

The direction sensor 21 detects geomagnetism and thereby outputs a detection signal indicating the direction that the image-capturing apparatus 20 is directed.

In this case, the direction in which the image-capturing lens 3L is directed is defined to be toward the front of the image-capturing apparatus 20. In response, the direction sensor 21 is provided in such a manner that the detection axis direction thereof matches the direction in which the image-capturing lens 3L is directed. As a result, when the image-capturing lens 3L is directed north, a value indicating north is obtained as a detection signal. When the image-capturing lens 3L is directed west, a value indicating west is obtained as a detection signal.

On the basis of such a detection signal of the direction sensor 21, it is possible to obtain information on the direction of an inclination in the pan direction.

In the case of the second embodiment, the same determination as in the first embodiment is performed with regard to an inclination in the tilt direction. That is, the system controller 2 in this case successively calculates and updates the average value At on the basis of the detection signal from the tilt-direction gyro sensor 22. Also, in parallel with this, the system controller 2 obtains a detection signal value from the tilt-direction gyro sensor 22 and obtains the average value At at each automatic image capturing timing, and determines whether or not the detection signal value in the tilt direction is within the range of the average value At±a.

This also applies generally to the pan direction as in the case of the first embodiment except that the detection signal value of the gyro sensor is changed to the detection signal value of the direction sensor 21.

That is, in this case, also, an average value of detection signal values for the past predetermined period in which the current time is used as a reference is calculated. At this time, for example, in a case where the image-capturing apparatus 20 has been swung nearly from the north west direction to the north east direction with north being the center in a certain period, as an average value calculated from the detection signal values of the direction sensor 21 in that period, an average value indicating approximately north is obtained. Similarly, in a case where the image-capturing apparatus 20 has been swung nearly from the north east direction to the south east direction with east being the center in a certain period, as an average value calculated from the detection signal values of the direction sensor 21 in that period, an average value indicating approximately east is obtained.

That is, as a result, also, by calculating the average value based on the detection signal values of the direction sensor 21, it is possible to define the direction in which the user is directed similarly to the case in which the average value Ap for the detection signal values of the gyro sensor are calculated. That is, it is possible to define the inclination (inclination=0) serving as a reference when the magnitude of the swinging of the image is to be determined.

Based on this point, hereinafter, also, the average value calculated with respect to the detection signal values of the direction sensor 21 is denoted as an average value Ap.

Whereas the system controller 2 in this case performs a process for successively calculating and updating the average value Ap of the detection signal values of the direction sensor 21, the system controller 2 obtains, at each automatic image capturing timing, the value of the detection signal of the direction sensor 21 and the average value Ap, and determines whether or not the obtained value of the detection signal is within a predetermined threshold value (set also as a in this case) in which the average value Ap is used as a reference. That is, it is determined whether or not the inclination is within the range of the average value Ap±a.

Then, also, in this case, on the basis of the result of the determination for the inclination in the pan direction and in the tilt direction, which is performed as described above, it is determined whether or not the inclination is within the range in both pan direction and the tilt direction. When it is determined that the inclination is within the range in both the pan direction and the tilt direction, the captured image data at that time is obtained. On the other hand, when it is determined that the inclination is not within the range in at least one of the pan direction and the tilt direction or the inclination is not within the range in both the pan direction and the tilt direction, captured image data at the time the inclination becomes within the range in both the pan direction and the tilt direction thereafter is obtained.

As can be understood from the foregoing description, in this case, the processing operation that should be performed by the system controller 2 is the same as that described earlier in the first embodiment (FIGS. 4 and 5) except that an inclination detection signal in the pan direction serves as a detection signal from the direction sensor 21 and an inclination detection signal in the tilt direction serves as a detection signal from the tilt-direction gyro sensor 22. Therefore, the repeated description of processing operation that should be performed by the system controller 2 in this case with reference to the drawings is omitted.

Third Embodiment

A third embodiment is formed such that an inclination serving as a reference in the pan direction is not set to be an average value Ap of detection signal values described thus far, but set to be a traveling direction of the user, which is estimated from the shift of past position information.

Figure 7:
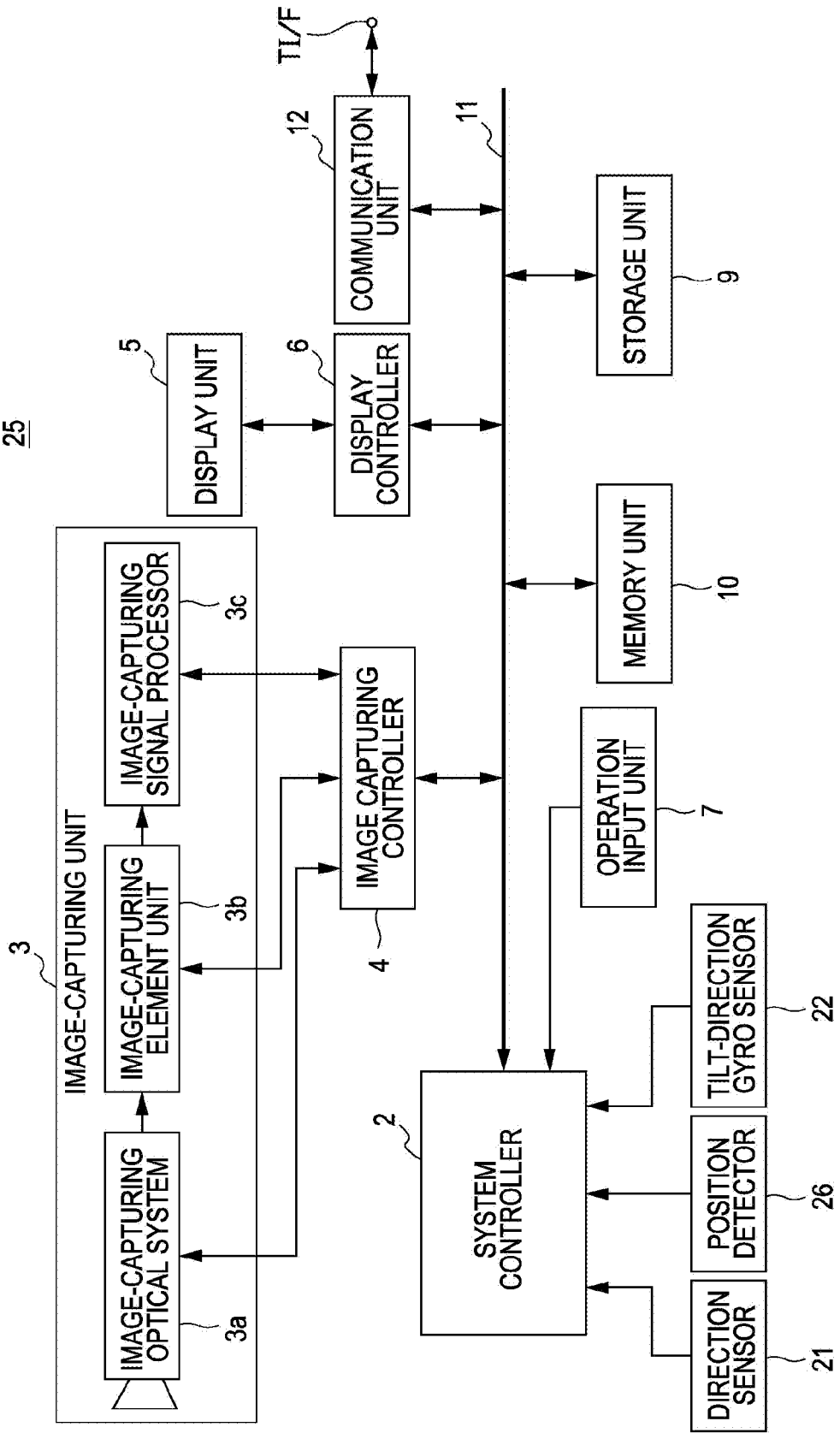
FIG. 7 is a block diagram showing the internal configuration of an automatic image-capturing apparatus according to a third embodiment of the present invention.

FIG. 7 shows the internal configuration of an image-capturing apparatus 25 according to a third embodiment of the present invention.

The image-capturing apparatus 25 is formed such that a position detector 26 is further added to the configuration of the image-capturing apparatus 20 in the above-described second embodiment.

The position detector 26 includes, for example, a global positioning system (GPS) GPS receiving unit, and detects current position information on the basis of the result in which communication with a GPS satellite (not shown) is performed.

The system controller 2 in this case estimates the traveling direction of the user on the basis of the position information detected by the position detector 26.

Figure 8:
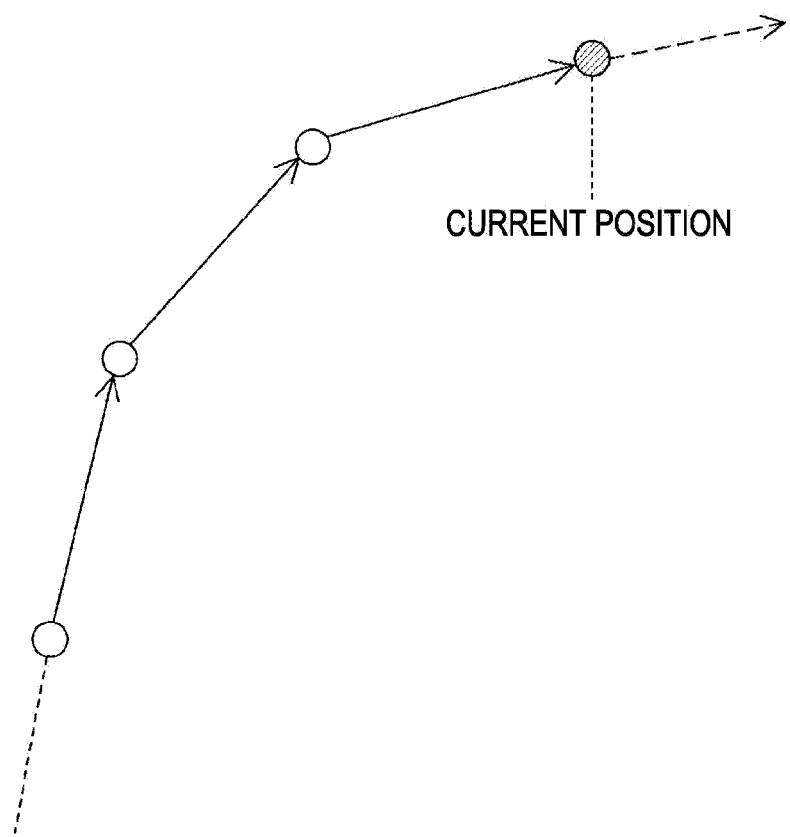
FIG. 8 illustrates a method of estimating a traveling direction.

An example of a traveling direction estimation technique is shown in FIG. 8.

In FIG. 8, the traveling direction of the user is estimated on the basis of the shift of the position from the past to the current time. More specifically, the direction of the movement from the position detected at the previous time to the position (current position) detected at the current time is assumed to be the traveling direction of the user.

In this case, the determination of whether or not the inclination in the pan direction is within a predetermined range is performed by using the traveling direction of the user, which is estimated in the manner described above, as a reference. That is, the system controller 2 in this case obtains, at each automatic image capturing timing, the value of the detection signal supplied from the direction sensor 21, and determines whether or not the direction (that is, toward the front of the image-capturing apparatus 25) specified using the detection signal value is within a predetermined angle range in which the estimated traveling direction is used as a reference.

In this case, for the system controller 2, a threshold value b has been set in advance as a value for defining the predetermined angle range, and the determination of whether or not the inclination is within the predetermined angle range is performed on the basis of the fact that when the value indicating the estimated traveling direction is denoted as B, the detection signal value obtained from the direction sensor 21 is within the range of B±b.

A description will be given for confirmation. In this case, also, similarly to the case of the above-described second embodiment, the average value At of inclinations in the tilt direction is calculated and updated, and a determination of whether or not the inclination in the tilt direction is within a predetermined range in which the average value At is used as a reference is performed at the automatic image capturing timing.

Then, when it is determined that the inclination is within the predetermined range in both the pan direction and the tilt direction on the basis of the results of such determinations for the inclination in the tilt direction and for the inclination in the pan direction based on the traveling direction, the captured image data obtained at the automatic image capturing timing is obtained. When it is determined that both inclinations are not within the range, the captured image data at the time both inclinations become within the range thereafter is obtained.

Processing Operation

Figure 9:
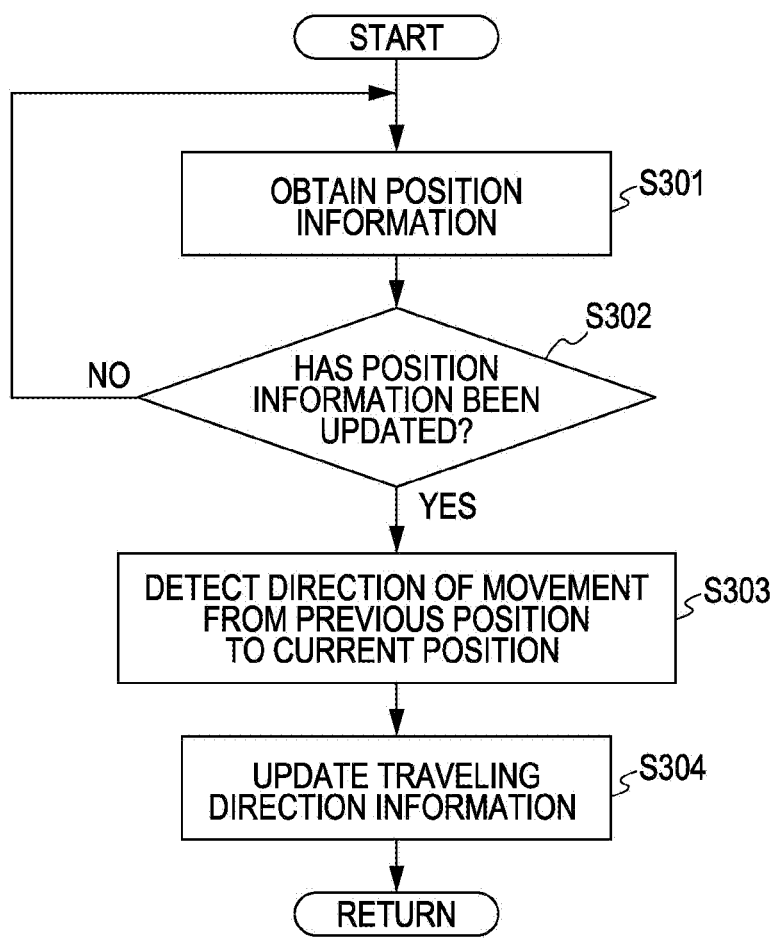
FIG. 9 is a flowchart showing a processing operation for estimating a traveling direction as processing operation that should be performed to implement operation as the third embodiment of the present invention.
Figure 10:
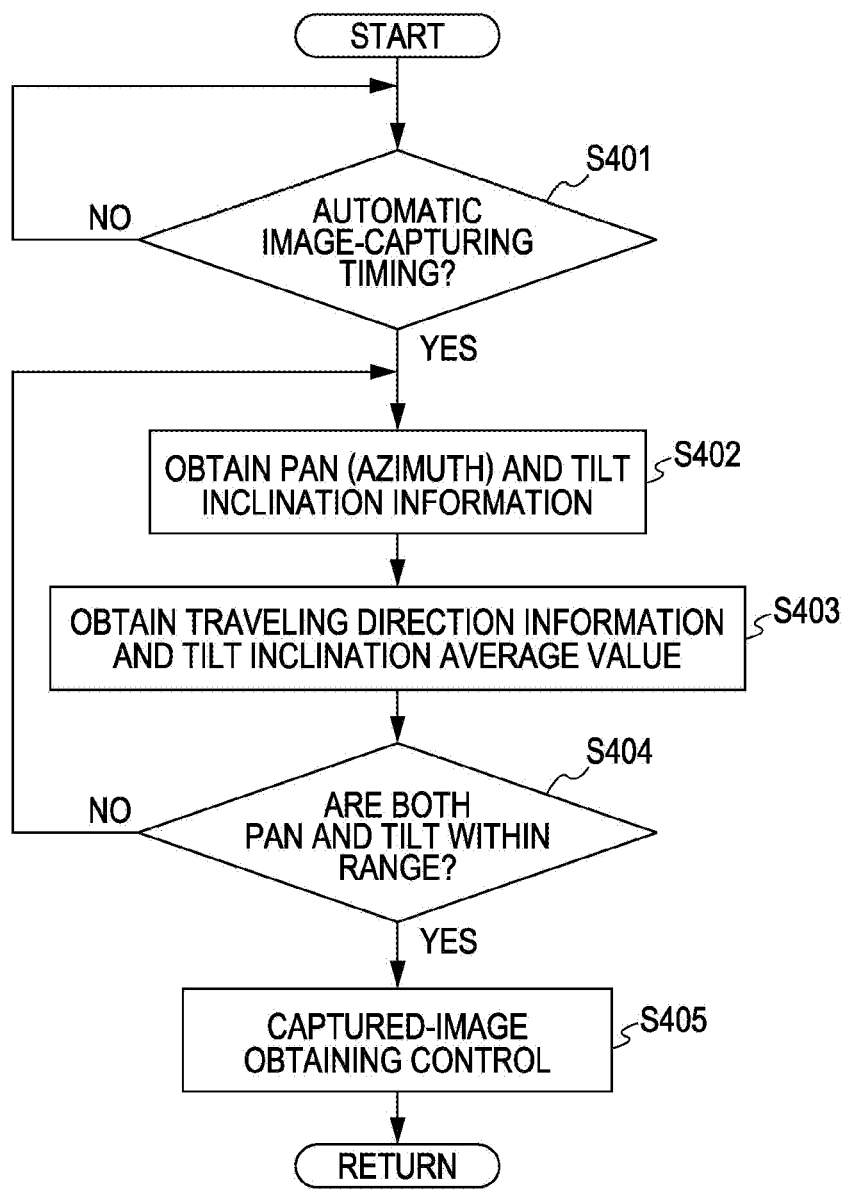
FIG. 10 is a flowchart showing a processing operation for performing image capturing control on the basis of the determination result of inclinations in pan and tilt directions as processing operation that should be performed to implement operation as the third embodiment of the present invention.

FIGS. 9 and 10 show processing operations that should be performed to implement operations as the third embodiment described in the foregoing.

FIG. 9 shows processing operation that should be performed to estimate a traveling direction. FIG. 10 shows processing operation that should be performed to perform captured image data obtaining control on the basis of detection signals in the pan and tilt directions.

The processing operations shown in these figures are performed by the system controller 2 shown in FIG. 6 in parallel in accordance with, for example, a program stored in an internal ROM.

Furthermore, in this case, a process for successively updating the information on the average value At is performed with respect to the tilt direction. This processing is the same as that described above with reference to FIG. 4, and accordingly, a repeated description thereof is omitted herein.

First, in FIG. 9, in step S301, position information is obtained. That is, the current position information detected by the position detector 26 is obtained, and this information is stored in, for example, an internal non-volatile memory.

In the subsequent step S302, it is determined whether or not the position information has been updated.

When a negative result is obtained in step S302 by determining that the position information obtained at the current time is not changed from the position information stored at the previous time and the position information has not been updated, the process returns to step S301 as shown in the figure, where position information for the next time is obtained. That is, since it is difficult to estimate the traveling direction unless the position information is not updated, in that case, operation waits until the position information is updated.

On the other hand, when an affirmative result is obtained in step S302 by determining that the position information obtained at the current time has been changed from the position information that was obtained and stored at the previous time and the position information has been updated, the process proceeds to step S303, where a process for detecting the direction of the movement from the previous position to the current position is performed.

That is, the direction of the movement from the position indicated by the position information obtained and stored in the process of step S301 above, which was performed immediately before, to the position indicated by the position information obtained in step S301 above is detected.

In the subsequent step S304, a process for updating traveling direction information is performed. That is, on the basis of the information on the movement direction detected in step S305 above, the information on the traveling direction of the user corresponding to the current time is updated. When the process of step S304 is performed, "RETURN" is reached.

Next, processing operation shown in FIG. 10 will be described.

In FIG. 10, in step S401, similarly to step S201 above of FIG. 5, operation waits until an automatic image capturing timing is reached. Then, when the automatic image capturing timing is reached, in step S402, a process for obtaining pan (azimuth) and tilt inclination information is performed. That is, the value of the detection signal from the direction sensor 21 is obtained with respect to the pan direction, and the value of the detection signal by the tilt-direction gyro sensor 22 is obtained with respect to the tilt direction.

In the subsequent step S403, a process for obtaining traveling direction information and a tilt inclination average value is performed. That is, the information on the traveling direction that is successively updated by the processing operation described above with reference to FIG. 9 is obtained and also, the information on the average value At of inclinations in the tilt direction, which is successively updated by parallel processing (not shown), is obtained.

In the next step S404, a determination process is performed as to whether or not both pan and tilt are within the range.

That is, with respect to the pan direction, it is determined whether or not the value of the detection signal from the direction sensor 21 obtained in step S402 is within the range of B±b in which the value B of the traveling direction information obtained in step S403 is used as a reference. In other words, it is determined whether or not the direction specified using the value of the obtained detection signal from the direction sensor 21 is within the range of a predetermined angle range in which the direction indicated by the traveling direction information is used as a reference.

Furthermore, with respect to the tilt direction, it is determined whether or not the value of the detection signal from the tilt-direction gyro sensor 22, which is obtained in step S402, is within the range of At±a in which the average value At obtained in step S403 is used as a reference.

When an affirmative result is obtained in step S404 above by determining that both pan and tilt are within the range on the basis of the results of the determinations in the pan direction and in the tilt direction, the process proceeds to step S405, where a captured image obtaining control process is performed.

When the obtaining control process of step S405 is performed, "RETURN" is reached as shown in the figure.

On the other hand, when a negative result is obtained in step S404 by determining that both pan and tilt are not within the range because at least one of the values of the detection signals is not within the range in the pan direction and in the tilt direction, the process returns to step S402 above as shown in the figure. As a result, in this case, also, obtaining of information on direction and tilt inclination→obtaining of traveling direction and average value At→a determination of whether or not being within the range are repeated until both pan and tilt become within the range. The captured image data at the time both the inclinations become within the predetermined range is obtained.

Fourth Embodiment

At this point, in each of the embodiments described thus far, swinging of a reproduced image with regard to an automatically captured image is reduced by not obtaining an obtained image in which an inclination is not within a predetermined range. A fourth embodiment (and a fifth embodiment to be described later) is formed such that such control of obtaining images is not performed, a determination of whether or not an inclination is within a predetermined range is performed during reproduction, and image display control is performed on the basis of the result, thereby reducing swinging of a reproduced image.

In particular, the fourth embodiment is formed such that an average value A of inclinations is calculated at a timing at which a captured image is obtained by automatic image capturing or the traveling direction is estimated.

Operation Outline

Figure 11:
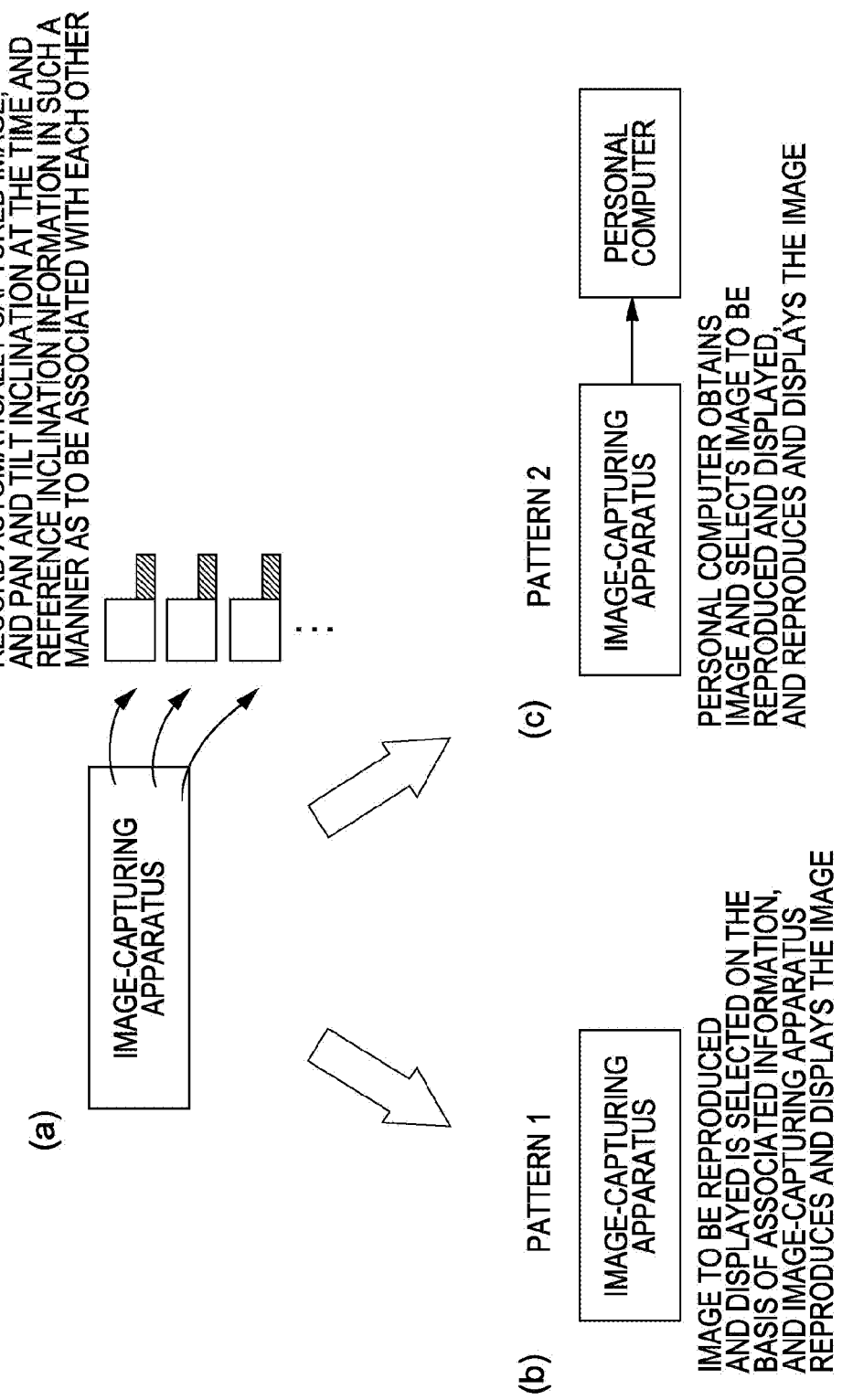
FIG. 11 illustrates the outline of operation according to a fourth embodiment of the present invention.

FIG. 11 illustrates operation outline of the fourth embodiment of the present invention.

Part (a) of FIG. 11 schematically shows operation (hereinafter referred to also as operation during recording) performed by the image-capturing apparatus in this case at an automatic image capturing timing.

Here, in the fourth embodiment, a description will be given in a summarized form with respect to all patterns for the following cases: a case in which, with respect to an inclination in the pan direction, as in the case of the first embodiment, it is determined whether or not a detection signal value from the gyro sensor is within the range of an average value Ap±a; a case in which, as in the second embodiment, it is determined whether or not, with respect to the pan direction, the detection signal value from the direction sensor 21 is within the range of the average value Ap±a of the detection signal values from the direction sensor 21, and with respect to the tilt direction, it is determined whether or not the detection signal value from the tilt-direction gyro sensor 22 is within the range of the average value At±a; and a case in which, as in the third embodiment, with respect to the pan direction, it is determined whether or not the direction specified using the detection signal of the direction sensor 21 is within the range of a predetermined angle range (within the range of B±b) in which the traveling direction estimated using the position information is used as a reference, and with respect to the tilt direction, it is determined whether or not the detection signal value from the tilt-direction gyro sensor 22 is within the range of the average value At±a.

Based on this point, in the following, for the sake of description, the value of the detection signal by the two-axis gyro sensor 8 described with reference to the first embodiment or the value of the detection signal by the direction sensor 21 and the tilt-direction gyro sensor 22 described with reference to the third embodiment will be collectively referred to as "pan and tilt direction inclination information".

Furthermore, the average value A calculated from detected signal values of the gyro sensor (two-axis gyro sensor 8 or the tilt-direction gyro sensor 22), the average value A calculated from detected signal values of the direction sensor 21, or the traveling direction estimated from the position information will be collectively referred to as "reference inclination information".

Furthermore, as can be understood from the foregoing description, in the case of the fourth embodiment, for the configuration of the image-capturing apparatus, one of the configurations described with reference to FIGS. 2, 6, and 7 described above is adopted. For the image-capturing apparatus of the fourth embodiment, it is only necessary for the system controller 2 shown in FIGS. 2, 6 and 7 to change a program that is internally stored so that processing operation for implementing operation as the fourth embodiment (to be described below) is performed.

Operation outline during recording in the image-capturing apparatus in this case shown in part (a) of FIG. 11, will be described below.

In the image-capturing apparatus in this case, an automatically captured image, and pan and tilt inclination information and reference inclination information at that time are recorded in such a manner as to be associated with each other. That is, in this case, all the images obtained at the automatic image capturing timing are obtained. Then, the average value A serving as the reference inclination information is calculated, and the traveling direction serving as the reference inclination information are estimated. Also, at each automatic image capturing timing, the pan and tilt inclination information and the reference inclination information are obtained, and the pan and tilt inclination information and the reference inclination information that are obtained in this manner are associated with the captured image data obtained by automatic image capturing.

In this case, the storage destination of the obtained pan and tilt inclination information and inclination reference information is set to the storage unit 9 in the same manner as for the captured image data. As a result, in the storage unit 9, at each automatic image capturing timing, the captured image data, and the pan and tilt inclination information and the inclination reference information are associated with each other and are sequentially stored.

In the fourth embodiment, on the basis of the pan and tilt inclination information and the reference inclination information that are associated with each item of captured image data in the manner described above, a determination of whether or not the inclination is within a predetermined range is performed, and on the basis of the result, image display control is performed.

Here, as a presumption, as the image-capturing apparatus of the embodiment, the stored image can be displayed on the display unit 5 provided in the image-capturing apparatus and also, the stored image can be transferred to an external device, such as a personal computer in the manner described above and displayed thereby. That is, based on this point, for image display control based on the pan and tilt inclination information and the reference inclination information that are associated with each other as described above, there can be two patterns: a case in which the image-capturing apparatus performs image display control and a case in which the external device side performs image display control.

Part (b) of FIG. 11 schematically shows, as pattern 1, operation for when the image-capturing apparatus performs display control.

Part (c) of FIG. 11 schematically shows, as pattern 2, operation for when image display control is performed by an external device (in this case, a personal computer) on the basis of the captured image data transferred (obtained) from the image-capturing apparatus side, and the pan and tilt inclination information and the reference inclination information that are each associated the captured image data.

The content of the display control that should be performed is the same for both patterns 1 and 2. That is, on the basis of the pan and tilt inclination information and the reference inclination information that are associated with each item of captured image data belonging to the reproduction target range, in response to, for example, reproduction instructions (display instructions) for an automatically captured image on the basis of user operation, each of the image-capturing apparatus in the case of pattern 1 and the personal computer in the case of pattern 2 determines, for each item of captured image data, whether or not the inclination is within a predetermined range in both the pan and tilt directions, and selects captured image data to be reproduced and displayed.

Then, control for the display means is performed so that only the captured image data that is selected in this manner, in which the inclinations in the pan and tilt directions are within the predetermined range is advanced, reproduced, and displayed.

Internal Configuration of Personal Computer

Figure 12:
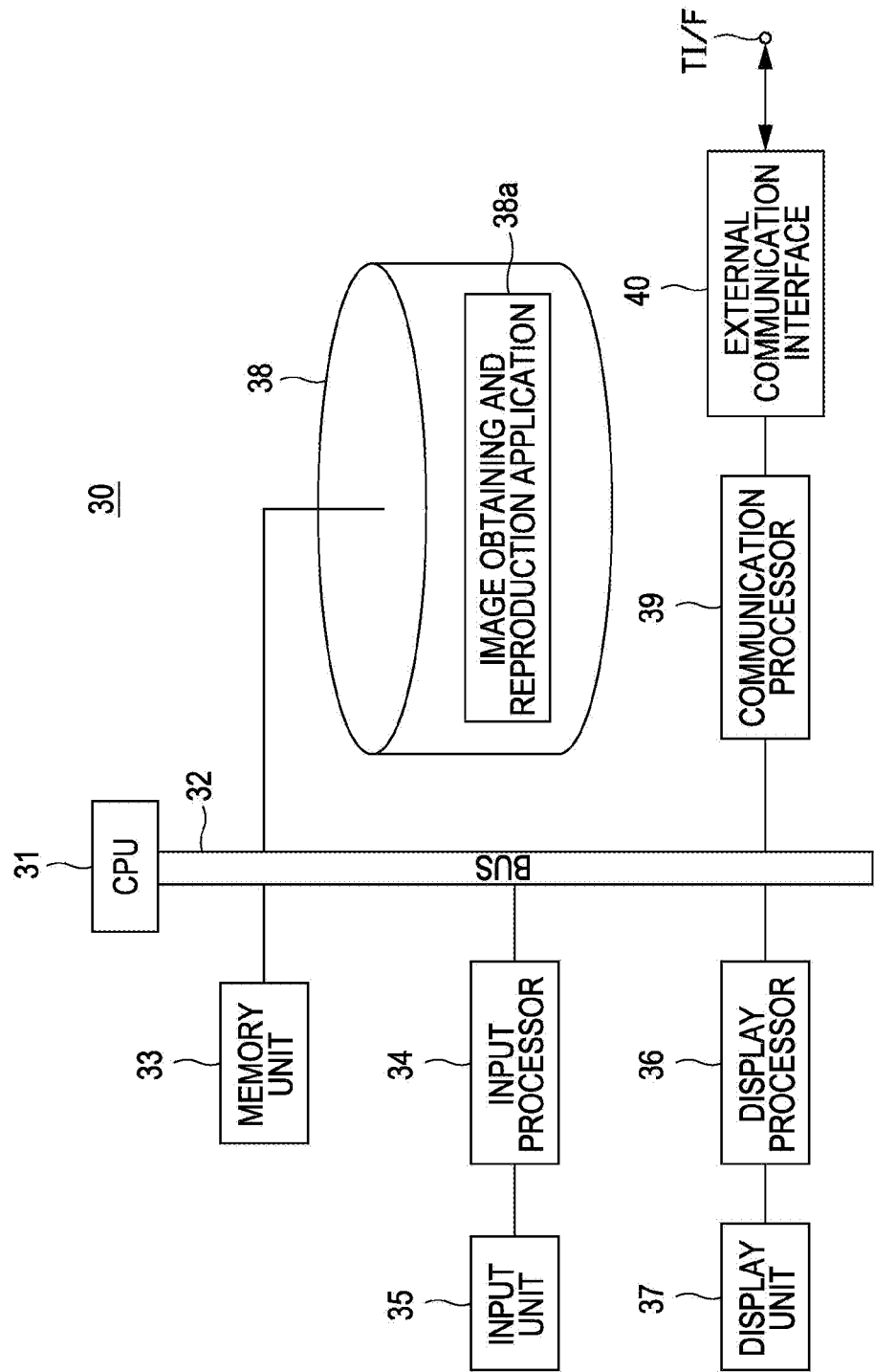
FIG. 12 is a block diagram showing the internal configuration of a personal computer used in the fourth embodiment of the present invention.

FIG. 12 shows the internal configuration of a personal computer 30 for performing image display control during reproduction in such a manner as to deal with the case of pattern 2.

In FIG. 12, a CPU 31 performs overall control and computation processing of the personal computer 30 in accordance with an initiated program. For example, the CPU 31 performs operation in response to operation input from an input unit 35 (to be described later), storage of a data file in an HDD 38, generation/update of management information, and others.

The CPU 31 performs transmission and reception of control signals and data to and from each unit via a bus 32 shown in the figure.

A memory unit 33 shows a ROM, a RAM, a flash memory, and the like used for processing by the CPU 31 in a comprehensive manner. In the ROM of the memory unit 33, operation programs, a program loader, and the like of the CPU 31 are stored. Furthermore, in the flash memory, various kinds of computation coefficients, parameters used in programs, and the like are stored, and in the RAM, a data area and a task area with which a program is executed are temporarily allocated.

In the HDD 38, under the control of the CPU 31, storage of data files, creation and update of management information, and the like are performed.

In this case, in the HDD 38, an image obtaining and reproduction application 38a by which the CPU 31 performs processing operation for implementing obtaining of captured image data from the image-capturing apparatus, and pan and tilt inclination information and reference inclination information associated therewith, and for implementing display control performed on the basis of the pan and tilt inclination information and reference inclination information is stored.

Furthermore, both the captured image data and pan and tilt inclination information and reference inclination information obtained from the image-capturing apparatus side can be recorded in the HDD 38.

The input unit 35 is formed as a keyboard, a mouse, a remote commander, and other input devices (not shown), and is provided to perform operation input. The information input via the input unit 35 is subjected to predetermined processing by an input processor 34 and is transferred as input of operation or data to the CPU 31. The CPU 31 performs necessary computations and control in such a manner as to correspond to the input information.

A display unit 37 is formed to be, for example, a liquid-crystal display unit, and displays various kinds of information to the user. For example, when the CPU 31 supplies display information to a display processor 36 in response to various operation status, the input status, and the communication status, the display processor 36 drives the display unit 37 on the basis of the supplied display data, thereby performing display output for the various kinds of information.

Under the control of the CPU 31, a communication processor 39 performs a transmission data encoding process and a reception data decoding process.

An external communication interface 40 transmits transmission data encoded by the communication processor 39 to an external device (in this case, the image-capturing apparatus) connected via a communication cable connected to an interface terminal TI/F (for example, a USB terminal shown in the figure. Furthermore, the external communication interface 40 transfers a signal transmitted from the external device, such as the image-capturing apparatus, to the communication processor 39 via the communication cable.

The communication processor 39 transfers the received information to the CPU 31.

Obtaining Process

Here, as pattern 2 shown in part (c) of FIG. 11, in a case where the personal computer 30 side performs display control, of course, it is necessary that captured image data stored in the image-capturing apparatus, and the pan and tilt inclination information and the reference inclination information associated therewith have been received. For confirmation purposes, a description will be given of a process for implementing reception of information from the image-capturing apparatus side.

First, on the personal computer 30 side, when the CPU 31 is connected to the image-capturing apparatus side through an external communication interface, for example, a USB cable, the CPU 31 instructs the transfer of each item of captured image data stored in the storage unit 9 of the image-capturing apparatus, and the pan and tilt inclination information and the reference inclination information that are associated with each item of captured image data.

On the image-capturing apparatus side, the system controller 2 performs, in response to the transfer instruction, reading control for the storage unit 9 and communication control for the communication unit 12 so that each item of captured image data stored in the storage unit 9, and the pan and tilt inclination information and the reference inclination information that are associated with each item of captured image data are transferred to the personal computer 30 side.

In this case, the correspondence between each item of captured image data and the pan and tilt inclination information and the reference inclination information can be understood also on the personal computer 30 side as a result of, for example, management information indicating the correspondence being separately transferred.

On the personal computer 30 side, the CPU 31 performs control so that each item of information transferred from the image-capturing apparatus side in the manner described above is recorded in the HDD 38. This completes obtaining of necessary information from the image-capturing apparatus side to the personal computer 30 side.

Regarding processing operation that should be performed so as to deal with the reception time, which is described in the foregoing, processing operation performed on the image-capturing apparatus side is performed by the system controller 2 in accordance with, for example, a program stored in the internal ROM, and processing operation on the personal computer 30 side is performed by the CPU 31 in accordance with the program as an image obtaining and reproduction application.

Furthermore, when transferring such information, in practice, after a process for confirming captured image data that has already been obtained before information is transferred, instructions for transferring information on only captured image data that has not been obtained may be issued.

Processing Operation

Next, a description will be given, with reference to flowcharts in FIGS. 13 and 14, of processing operations for implementing operations as the fourth embodiment described with reference to FIG. 11 above.

Figure 13:
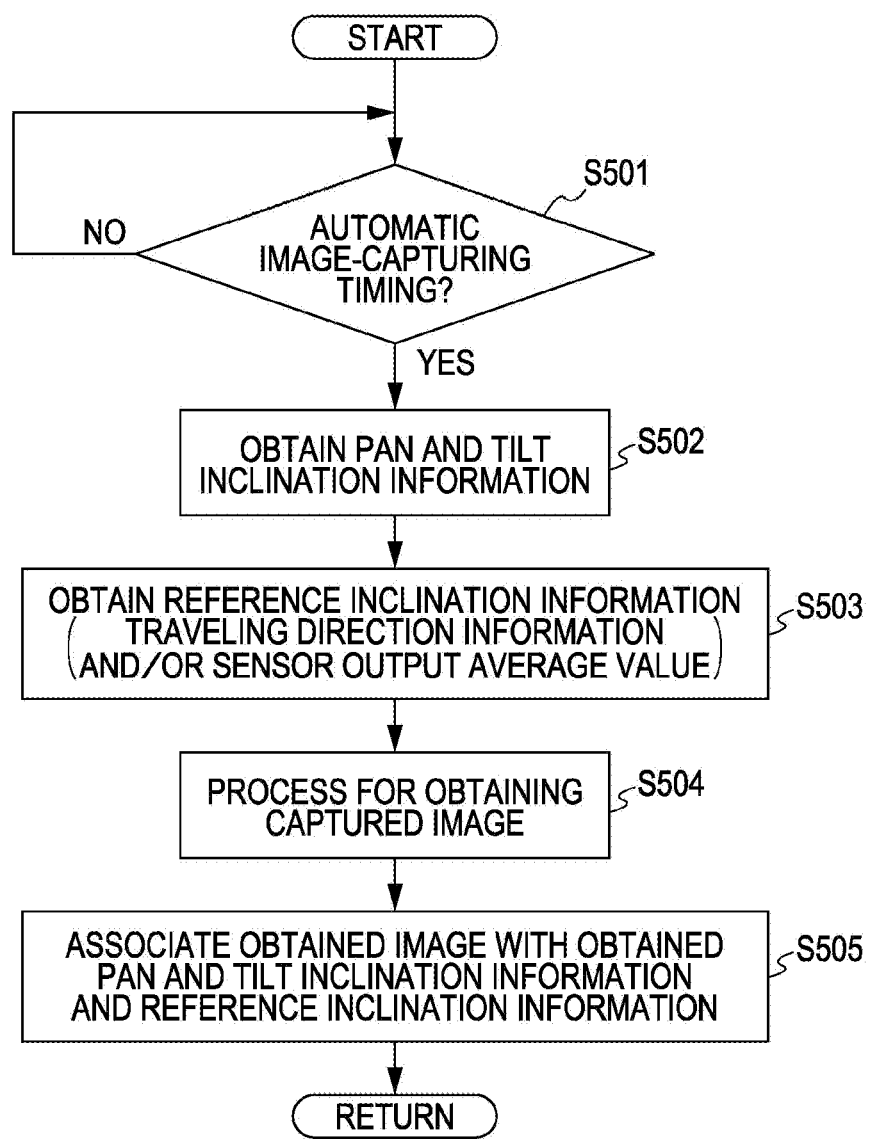
FIG. 13 is a flowchart showing a processing operation that should be performed in correspondence with the recording time in the automatic image-capturing apparatus as processing operation for implementing operation of the fourth embodiment of the present invention.

FIG. 13 shows processing operation that should be performed to implement operation that is performed during recording by the image-capturing apparatus as the fourth embodiment described with reference to part (a) of FIG. 11 above. The processing operation shown in this figure is performed by the system controller 2 in accordance with, for example, a program stored in an internal ROM.

In the image-capturing apparatus in this case, the processing operation for successively updating reference inclination information is performed in parallel with the processing operation shown in this figure. For such a process for updating reference inclination information, it is only necessary to perform one of the processes described with reference to the first to third embodiments (FIGS. 4 and 9).

Referring to FIG. 13, in step S501, similarly to step S201 above, operation for waiting for an automatic image capturing timing is performed. When the automatic image capturing timing is reached, in step S502, a process for obtaining pan and tilt inclination information is performed. That is, in the case of the configuration of the image-capturing apparatus adapted to the first embodiment, a process for obtaining the values of detection signals in the pan direction and the tilt direction is performed by the two-axis gyro sensor 8. Furthermore, in the case of the configuration of the image-capturing apparatus adapted to the second or third embodiment, a process for obtaining the value of a detection signal from the direction sensor 21 and the value of a detection signal from the tilt-direction gyro sensor 22 is performed.

In the subsequent step S503, a process for obtaining reference inclination information is performed. That is, in the case of the configuration of the image-capturing apparatus adapted to the first embodiment, a process for obtaining an average value Ap and an average value At based on detection signal values in the pan direction and in the tilt direction by the two-axis gyro sensor 8, which are successively updated by processing operation performed in parallel with the processing operation shown in this figure, is performed, respectively. Furthermore, in the case of the configuration of the image-capturing apparatus adapted to the second embodiment, a process for obtaining an average value Ap of detection signal values from the direction sensor 21 and for obtaining an average value At of detection signal values from the tilt-direction gyro sensor 22, which are successively updated, is performed.

Furthermore, in the case of the configuration of the image-capturing apparatus adapted to the third embodiment, a process for obtaining information on traveling direction estimated from the position information that is successively updated by processing operation performed in parallel with processing operation shown in this figure and for obtaining an average value At of detection signal values from the tilt-direction gyro sensor 22 is performed.

In the next step S504, a captured image obtaining control process is performed. That is, control is performed so that captured image data (compressed image data) is recorded in the storage unit 9 by a process identical to that in step S205 of FIG. 5 above.

After that, in the next step S505, a process for associating obtained images with the obtained pan and tilt inclination information and reference inclination information is performed. For example, in this case, the correspondence between the captured image data; and the pan and tilt inclination information and the reference inclination information is managed using management information. In step S505, control is performed in such a manner that the pan and tilt inclination information and the reference inclination information obtained in steps S502 and S503 above are recorded in the storage unit 9. Also, a process for updating information content of the management information in such a manner that the recorded pan and tilt inclination information and reference inclination information are associated with the captured image data recorded in step S504 is performed.

When the process of step S505 is completed, "RETURN" is reached as shown in the figure.

Figure 14:
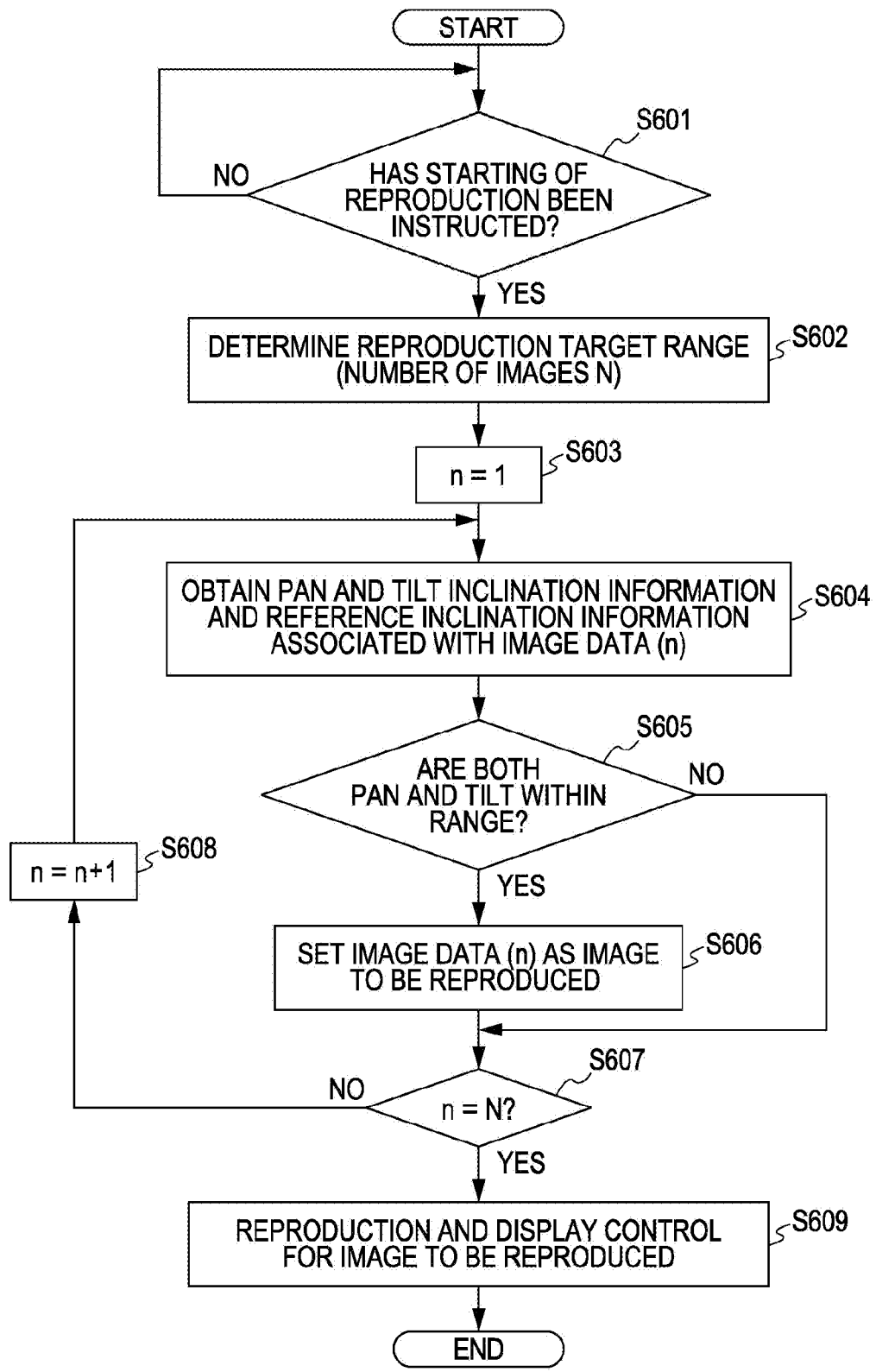
FIG. 14 is a flowchart showing a processing operation that should be performed in correspondence with reproduction time as processing operation for implementing operation of the fourth embodiment of the present invention.

FIG. 14 shows processing operation that should be performed to implement operation performed by the image-capturing apparatus during reproduction in the case of pattern 1 described with reference to part (b) of FIG. 11 or to implement operation performed by the image-capturing apparatus during reproduction in the case of pattern 2 described with reference to part (c) of FIG. 11.

As was also described above, image display control during reproduction applies the same for pattern 1 and pattern 2. Based on this fact, with reference to FIG. 14, processing operation that should be performed by the personal computer 30 will be described in a summarized manner.

In the case of pattern 1, the processing operation shown in this figure is performed by the system controller 2 in accordance with, for example, a program stored in the internal ROM. In the case of pattern 2, the processing operation shown in the figure is performed by the CPU 31 in accordance with a program as the image obtaining and reproduction application 38a shown in FIG. 12 above.

In FIG. 14, in the initial step S601, operation for waiting for reproduction start instruction is performed.

That is, operation for waiting for reproduction start instruction for automatically captured image data, which is issued by, for example, user operation input or the like from the operation input unit 7 (in the case of pattern 1) and the input unit 35 (in the case of pattern 2) is performed.

When the reproduction start instruction has been issued, in step S602, a process for determining a reproduction target range is performed. That is, when the reproduction start instruction detected in step S601 above instructs the starting of reproduction of images inside a necessary folder, image data in the folder is determined to be in a reproduction target range. When the reproduction start instruction instructs the starting of reproduction of all the images recorded in the storage unit 9 or in the HDD 38, all those images are determined to be in a reproduction target range. Then, in response to the reproduction target range being determined in this manner, the value of the total number N of image data in the reproduction target range is obtained.

In the subsequent step S603, a process for setting an image identification value n to 1 (n=1) is performed. As is clear from the following description, the image identification value n is a value for the system controller 2 or the CPU 31 to count in order to identify each item of captured image data in the reproduction target range.

In the next step S604, pan and tilt inclination information and reference inclination information that are associated with image data (n) are obtained. That is, the image data (n) recorded in the storage unit 9 (pattern 1) or in the HDD 38 (pattern 2), and the pan and tilt inclination information and the reference inclination information that are associated therewith are obtained.

In the subsequent step S605, it is determined whether both pan and tilt are within the range. That is, on the basis of the pan and tilt inclination information and the reference inclination information obtained in step S604 above, a determination of whether or not the inclination in the pan direction is within a predetermined range, and a determination of whether or not the inclination in the tilt direction is within a predetermined range are performed. Based on these determination results, it is determined whether or not the inclination is within the predetermined range in both the pan direction and the tilt direction.

When an affirmative result that both pan and tilt are within the range is obtained in step S605 on the basis of the determination in the pan direction and in the tilt direction, the process proceeds to step S606, where image data (n) is set as a reproduction target image. Thereafter, the process proceeds to step S607.

On the other hand, when a negative result is obtained in step S605 by determining that the inclination is not within the range in at least one of the pan direction and the tilt direction and both pan nor tilt are not within the range, the process directly proceeds to step S607.

In step S607, it is determined whether or not n=N. That is, it is determined whether or not a determination as to inclinations has been completed for all the image data in the reproduction target range. When it is determined in step S607 that a negative result is obtained by determining n≠N, the value of the identification value n is incremented (n=n+1) in step S608, and then, the process returns to step S604. As a result, the processing is repeated until a determination as to the inclinations for all the image data in the reproduction target range is completed.

On the other hand, when an affirmative result is obtained in step S607 by determining that n=N, the process proceeds to step S609, where reproduction and display control for the reproduction target image is performed. That is, regarding image data that is set as reproduction target image by the setting process of step S606 within the image data in the reproduction target range determined in step S602 above, control (in the case of pattern 1) for the storage unit 9 and the display controller 6 or control for the HDD 38 and the display processor 36 is performed in such a manner that the reproduced image data is sequentially advanced and displayed on the display unit 5.

When the process of step S609 has been performed, the processing operation shown in this figure is completed.

At this point, according to the fourth embodiment as described above, it is possible to obtain all automatically captured images during recording in view of reducing swinging of a reproduced image. That is, according to the fourth embodiment, whereas swinging of a reproduced image is reduced by display control, display of all the automatically captured images can be also performed as necessary.

For example, when obtaining control is performed as in the first to third embodiments, even with an image that is deemed important, such as an image capturing a decisive moment, when the inclination is not within a predetermined range, the obtaining (recording) thereof is not performed, with the result that it becomes not possible for the user to browse the image. However, according to the method of the fourth embodiment, since all automatically captured images can be recorded, the image can be reproduced and displayed as necessary.

Fifth Embodiment

In the fourth embodiment described in the foregoing, the calculation of the average value A of inclinations and the estimation of a traveling direction are performed in advance during recording in which automatically captured images are recorded. However, in a fifth embodiment of the present invention, the calculation of the average value A and the estimation of the traveling direction are performed during reproduction in an ex-post manner.

In the fifth embodiment, the configuration of the image-capturing apparatus and the configuration of the personal computer 30 is only necessary to be identical to those in the case of the fourth embodiment, and a repeated description thereof is omitted.

Figure 15:
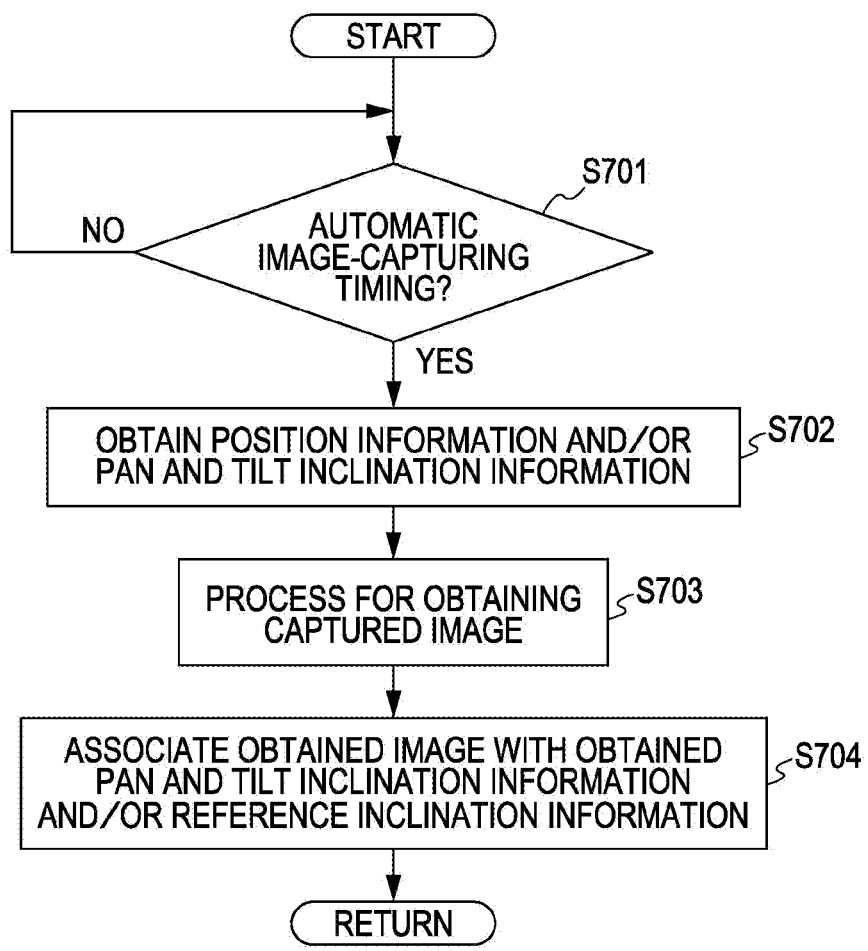
FIG. 15 is a flowchart showing a processing operation that should be performed in correspondence with recording time in the automatic image-capturing apparatus as processing operation for implementing operation of a fifth embodiment of the present invention.
Figure 16:
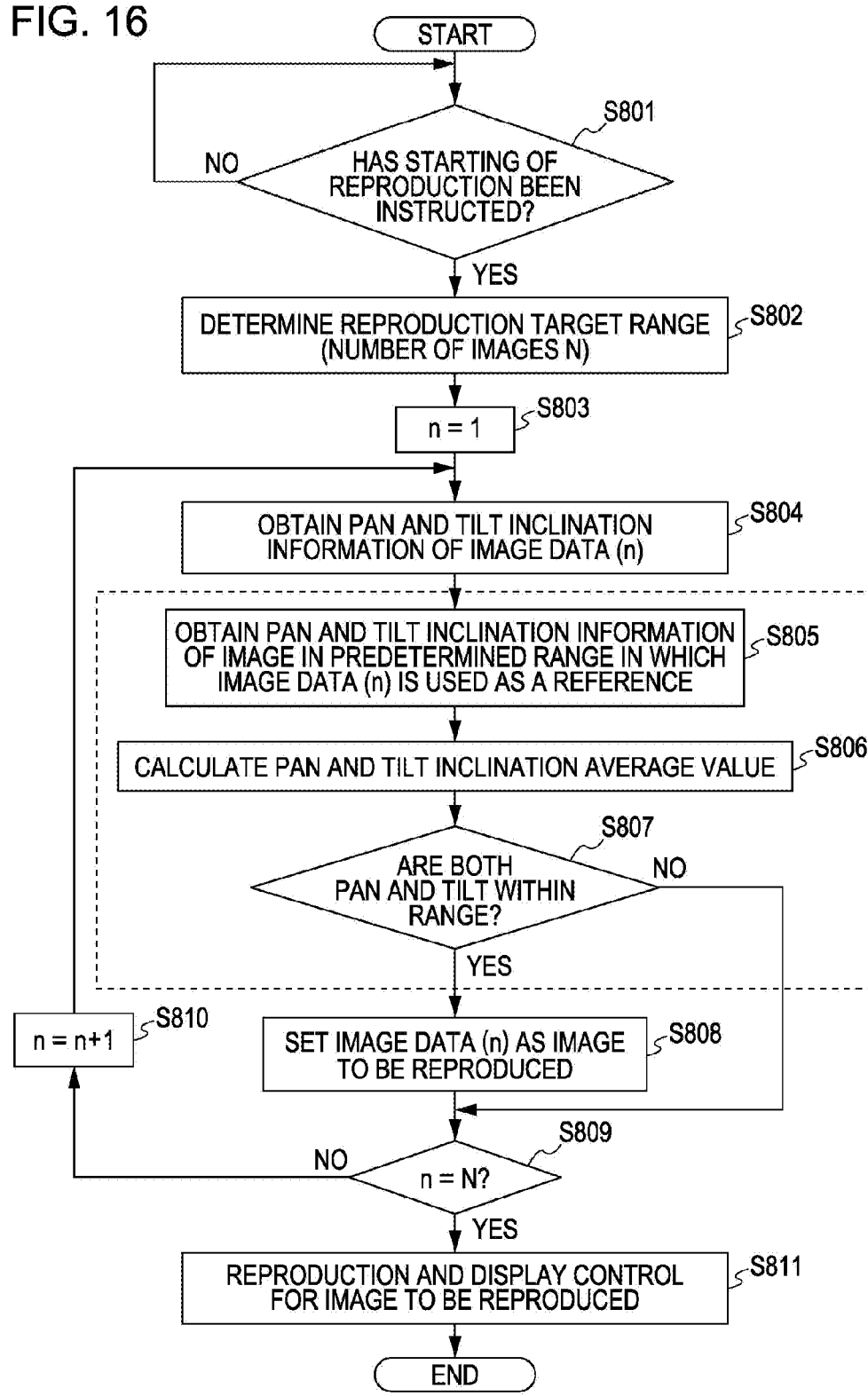
FIG. 16 is a flowchart showing a processing operation (in a case where the first and second embodiments are applied) that should be performed in correspondence with reproduction time as processing operation for implementing operation of the fifth embodiment of the present invention.
Figure 17:
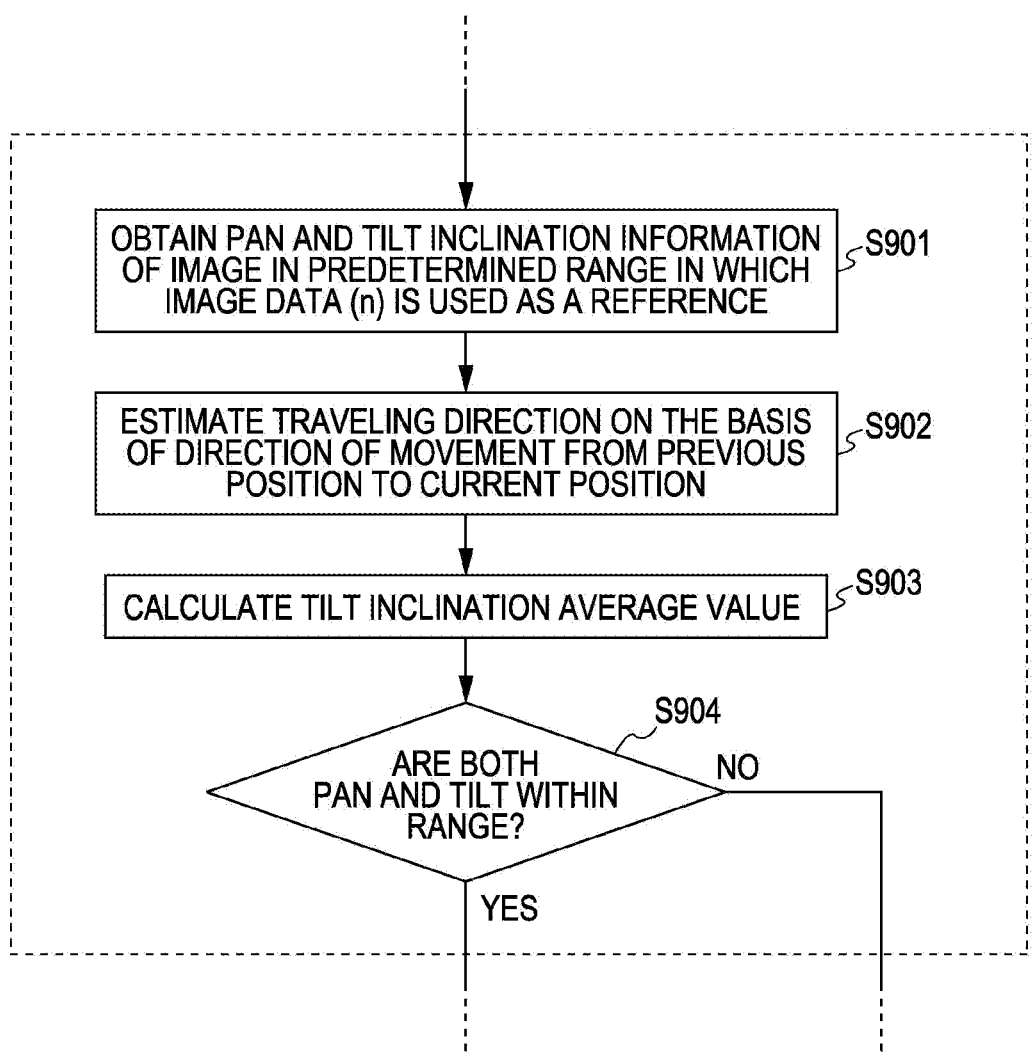
FIG. 17 is a flowchart showing a processing operation (in a case where the third embodiment is applied) that should be performed in correspondence with reproduction time as processing operation for implementing operation of the fifth embodiment of the present invention.

Flowcharts of FIGS. 15 to 17 show processing operations for implementing operations as the fifth embodiment in which the calculation of the average value A and the estimation of the traveling direction are performed in the manner described above during reproduction.

First, with reference to FIG. 15, a description will be given of processing operation that should be performed by the image-capturing apparatus in this case during recording. The processing operation shown in FIG. 15 is performed by the system controller 2 in accordance with, for example, a program stored in an internal ROM.

In FIG. 15, in the initial step S701, operation for waiting for an automatic image capturing timing is performed. When the automatic image capturing timing is reached, in step S702, a process for obtaining position information and/or pan and tilt inclination information is performed.

That is, when, as in the case of the first embodiment, the average values Ap and At of inclinations in the pan and tilt directions are to be calculated on the basis of the value of the detection signal of the two-axis gyro sensor 8, the values of the detection signals in the pan direction and in the tilt direction of the two-axis gyro sensor 8 are obtained. When, as in the case of the second embodiment, the inclination average value Ap in the pan direction is to be calculated on the basis of the values of the detection signals by the direction sensor 21 and the inclination average value At in the tilt direction is to be calculated on the basis of the values of the detection signals of the tilt-direction gyro sensor 22, the values of the detection signals from the direction sensor 21 and the tilt-direction gyro sensor 22 are obtained. Furthermore, when, as in the case of the third embodiment, the reference inclination of the pan direction is set to be a traveling direction, values of detection signals from the direction sensor 21 and values of detection signals from the tilt-direction gyro sensor 22 are obtained. Furthermore, in this case, position information detected by the position detector 26, which is necessary to estimate the traveling direction, is also obtained.

In the subsequent step S703, captured image obtaining control is performed. In the subsequent step S704, a process for associating an obtained image with the obtained position information and/or pan and tilt inclination information is performed. Here, the correspondence between the position information and/or the pan and tilt inclination information; and the obtained image is managed using management information. For this reason, in step S704, a process for updating the content of the management information in such a manner that the position information and/or the pan and tilt inclination information obtained in step S702 above is recorded in the storage unit 9 and also the position information and/or the pan and tilt inclination information is associated with the captured image data recorded in step S703 above is performed.

When the process of step S704 has been completed, "RETURN" is reached as shown in the figure.

Next, a flowchart in FIG. 16 shows processing operation that should be performed on the image-capturing apparatus side or on the personal computer 30 side during reproduction.

Here, the processing during reproduction slightly differs between when the average value Ap is to be calculated as reference inclination information in the pan direction and when the traveling direction of the user is to be estimated. FIG. 16 shows processing operation that should be performed in correspondence with a case in which the average value Ap is to be calculated.

The processing operation shown in FIG. 16 is performed by the system controller 2 in accordance with, for example, a program stored in an internal ROM, or is performed by the CPU 31 in accordance with a program as the image obtaining and reproduction application 38a (this applies the same for FIG. 17).

In FIG. 16, first, as a result of processing of step S801→step S803, similarly to the processing of step S601→step S603 of FIG. 14 above, a reproduction target range and the value of the total number N of images within the range are obtained in response to a reproduction start instruction and also, the image identification value n is set to 1 (n=1). In the next step S804, similarly to step S604 above, pan and tilt inclination information for image data (n) is obtained.

In this case, in step S805 subsequent to step S804 and in subsequent steps, the calculation of the average value A, and a process for making a determining as to the inclination on the basis of the average value A are performed.

That is, first, in step S805, a process for obtaining pan and tilt inclination information of an image in a predetermined range in which image data (n) is used as a reference is performed. That is, pan and tilt inclination information associated with each item of image data that is captured in a predetermined period that is more in the past than the automatic image capturing timing of the image data (n) within the image data in the reproduction target range determined in step S802 is obtained.

In the subsequent step S806, average values of pan and tilt inclinations are calculated. That is, by calculating those average values on the basis of the pan and tilt inclination information obtained in step S804 above and the past pan and tilt inclination information obtained in step S805 above, the inclination average value Ap in the pan direction and the inclination average value At in the tilt direction are computed.

In the next step S807, it is determined whether or not both pan and tilt are within the range.

When an affirmative result that both pan and tilt are within the range is obtained in step S807 on the basis of the results of the determination in the pan direction and the determination in the tilt direction, the process proceeds to step S808, where a process for setting image data (n) as a reproduction target image and then, the process proceeds to step S809.

On the other hand, when a negative result is obtained by determining that both pan and tilt are not within the range because at least one of the inclinations is not within the range, the process proceeds directly to step S809.

In step S809, it is determined whether or not n=N. When a negative result is obtained by determining that n is not N, in step S810, the value of the identification value n is incremented (n=n+1) and thereafter, the process returns to step S804 above. As a result, the processing is repeated until the determination as to the inclination based on the average value is completed for all the image data in the reproduction target range.

On the other hand, when an affirmative result is obtained in step S809 above by determining that n=N, the process proceeds to step S811, where reproduction and display control for a reproduction target image is performed similarly to step S609 above. When the processing of step S811 has been performed, the processing operation shown in this figure is completed.

FIG. 17 shows processing operation that should be performed in correspondence with a case in which the reference inclination information of the pan direction is set as a traveling direction. When the reference inclination information of the pan direction is set as a traveling direction, only the processing (steps S805 to S807) for a portion surrounded by a dashed line in FIG. 16 above differs. The processing operation other than the portion surrounded by the dashed line is identical to those of FIG. 16. Accordingly, FIG. 17 shows only the processing of the extracted portions differing from those of FIG. 16.

First, in this case, as processing in place of step S805 of FIG. 16, step S901 in the figure is performed. In step S901, a process for obtaining position information and tilt inclination information of an image in a predetermined range in which image data (n) is used as a reference is performed. That is, with respect to the tilt direction, inclination information (the values of the detection signals of the tilt-direction gyro sensor 22) in the tilt direction, which is obtained for a predetermined period more in the past than the obtaining timing of image data (n), which is necessary to calculate the average value At, is obtained. With respect to the pan direction, position information associated with the image data (n), and position information associated with the image data (n) that was captured immediately before image data (n−1), which is necessary to estimate the traveling direction, are obtained.

In the subsequent step S902, a process for estimating the direction of the movement from the previous position to the current position is performed. That is, on the basis of the position information of the image data (n) obtained in step S901 above and the position information of the image data (n−1), the direction of the movement from the previous position to the current position is detected so as to estimate the traveling direction of the user.

In the next step S903, the average value of tilt inclinations is calculated. That is, on the basis of the inclination information in the tilt direction of the image data (n), which was obtained in step S804 performed as a process preceding to step S901 above, and the inclination information in the tilt direction for the past predetermined period, which was obtained in step S901 above, the average value At of the inclinations is calculated.

After that, in the next step S904, it is determined whether or not both pan and tilt are within the range. That is, with respect to the pan direction, it is determined whether or not the direction of the inclination specified on the basis of the detection signal value from the direction sensor 21, which is obtained in step S804, is within a predetermined angle range (B±b) in which the traveling direction estimated in step S902 is used as a reference. Furthermore, with respect to the tilt direction, it is determined whether or not the value of the detection signal from the tilt-direction gyro sensor 22, which is obtained in step S804, is within a predetermined range (At±a) in which the average value At calculated in step S903 is used as a reference. Then, on the basis of the results of these determinations, it is determined whether both values are within the range in both the pan direction and the tilt direction.

In a case where an affirmative result is obtained in step S904, processing operations performed in correspondence with the case in which a negative result is obtained are identical to those in the case of FIG. 16 above, and accordingly, a repeated description is omitted herein.

Here, according to the fifth embodiment, regarding processing that should be performed on the image-capturing apparatus side during recording, the average value calculation process and the traveling direction estimation process can be omitted. In particular, as pattern 2, when a display control process during reproduction is to be performed by an external device, such as the personal computer 30, on the image-capturing apparatus side, it is only necessary to perform at least a process for obtaining an automatically captured image, a process for obtaining position information and/or pan and tilt inclination information, and a process for associating the obtained information with the obtained image. That is, a processing burden on the image-capturing apparatus side can be correspondingly reduced more than in a case in which the method of each of the above-described embodiments is adopted.

If the processing burden is reduced, power consumption can also be reduced. In particular, an image-capturing apparatus in this case is assumed to be mainly used outdoors as a wearable-type automatic image-capturing apparatus and is battery-driven. In this case, if power consumption is reduced, the driving time period of the apparatus can be lengthened. As a consequence, image capturing for a longer period of time is made possible, and the charging frequency of the battery can be reduced, making it possible to alleviate nuisance related to charging of the battery.

Modification

In the foregoing, the embodiments of the present invention have been described. However, the present invention should not be limited to the specific examples described thus far.

For example, in the description thus far, a case has been described in which an image in which both the inclination in the pan direction and the inclination in the tilt direction are within a predetermined range is obtained or displayed has been exemplified. Alternatively, in a case where the inclination in one of the pan direction and the tilt direction is within a predetermined range, the image may be captured or displayed.

Furthermore, in the description thus far, as means for detecting an inclination in the tilt direction, only the gyro sensor is shown as an example. Alternatively, for example, an inclination in the tilt direction may be detected using another means, such as, for example, a gravity sensor.

Furthermore, in the description thus far, a case in which, as a determination of whether or not the inclination in the pan direction is within a predetermined range, only the determination based on a detection signal value by the gyro sensor is performed, or a case in which only the determination (two patterns of a case in which, as reference inclination information, the average value Ap of directions is used, and a traveling direction is used) based on detection signal value by the direction sensor 21 is performed, has been exemplified. Alternatively, a plurality of determinations among them may be made, and when an affirmative result is obtained on the basis of at least a plurality of determinations, a final determination result that the inclination in the pan direction is within a predetermined range may be obtained.

By making a comprehensive determination based on detection signal values from different sensors in the manner described above, it is possible to make an accurate determination in which an inclination that occurs in the image-capturing apparatus in practice is reflected. This point applies the same for the tilt direction.

Furthermore, in the description thus far, it is presumed that the values of "a" and "b" that are set when a determination of whether or not the inclination is within a predetermined range is to be made are fixed. These values can be variable. For example, as a result of a determination, when the number of images to be captured or displayed is small, the values of "a" and "b" may be increased so that a larger number of images are captured or displayed. Conversely, when the number of images to be captured or displayed is large, the values of "a" and "b" may be decreased so that only the image with a smaller inclination is captured or displayed.

Furthermore, in particular, in the fifth embodiment, when the average value A is to be calculated in an ex-post manner during reproduction, during recording, only the pan and tilt inclination information obtained at each automatic image capturing timing is recorded. Alternatively, not only such pan and tilt inclination information obtained at each automatic image capturing timing, but also pan and tilt inclination information obtained between automatic image capturing timings can be recorded.

By also recording pan and tilt inclination information obtained between automatic image capturing timings in this manner, during reproduction, the average value A can be calculated by using many items of inclination information obtained between automatic image capturing timings, and as a result, the reliability of the average value A can be improved.

Here, specific processing content that should be performed in correspondence with a case in which the average value A is to be calculated, including pan and tilt inclination information obtained between automatic image-capturing timings in the manner described above, will be described. First, during recording, pan and tilt inclination information obtained at each automatic image capturing timing may be recorded in association with obtained image in the same manner as in the description thus far. The pan and tilt inclination information obtained between automatic image-capturing timings is separately recorded in such a manner that the relationship between obtaining timings, including each automatic image capturing timing in the time axis, is shown.

Furthermore, during reproduction, when the average value A is to be calculated, an average value of the pan and tilt inclination information for a past predetermined period in which the obtaining timing (automatic image capturing timing) of a target image is used as a reference, including the pan and tilt inclination information between automatic image-capturing timings, which is separately recorded in the manner described above, may be calculated.

For the position information for estimating the traveling direction, the position information obtained at a detection timing immediately before each automatic image capturing timing in the position detector 26 is recorded. As a result, the direction of the movement from the position at the timing more immediately before the obtaining timing of the target image when compared to the case in which the traveling direction is estimated from the position information obtained at each automatic image capturing timing can be determined. As a result, it is possible to more accurately estimate the traveling direction.

Furthermore, in the fifth embodiment, when the average value A is to be calculated in an ex-post manner during reproduction, only the pan and tilt inclination information obtained in a period more past than the obtaining timing of the target image is used. Alternatively, the average value A may be calculated including the pan and tilt inclination information obtained at a timing in the past in the time axis than the obtaining timing of the target image.

Figure 18:
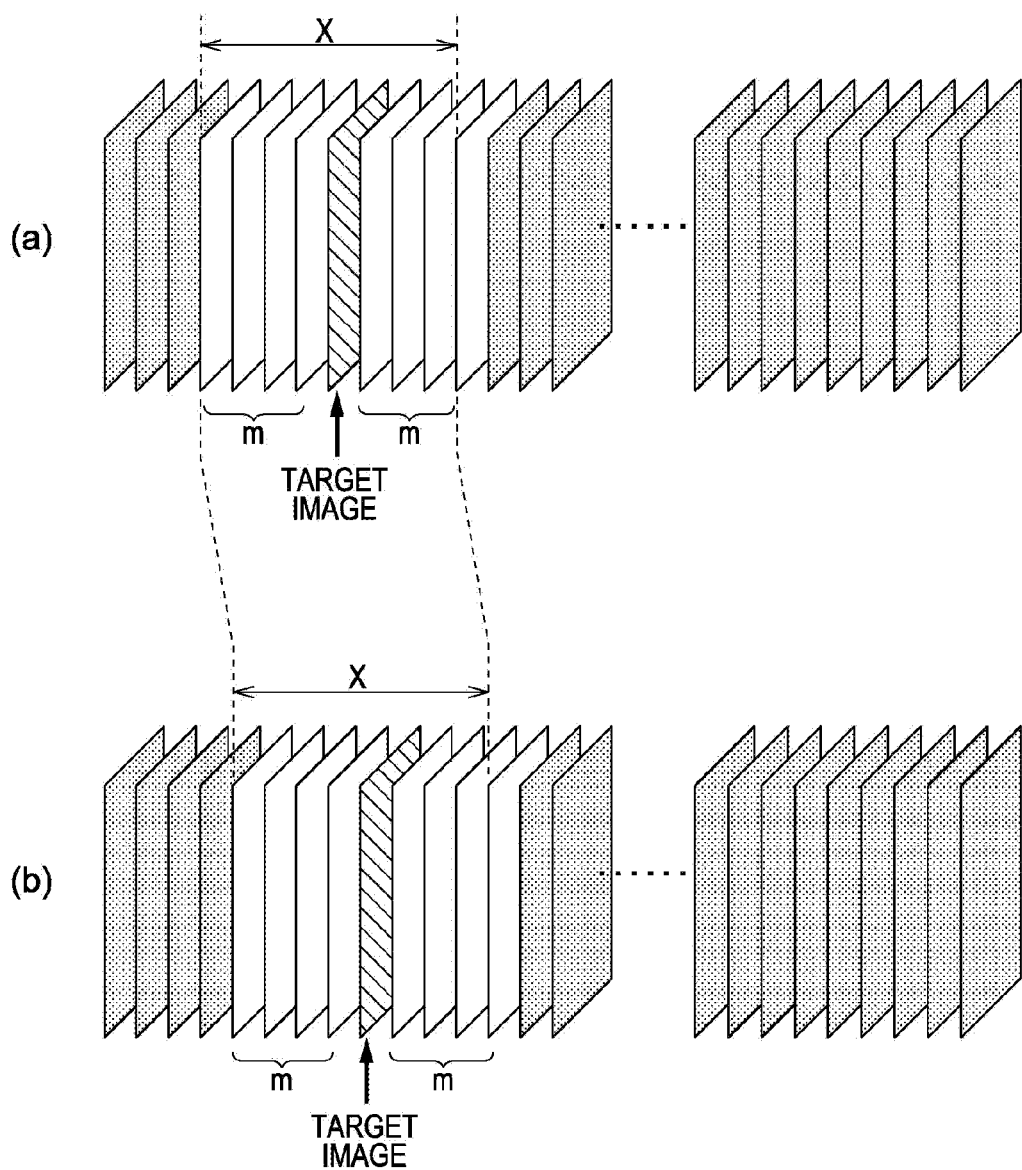
FIG. 18 illustrates a modification of calculating an average value according to the fifth embodiment of the present invention.

At this point, an example thereof is shown in FIG. 18.

As shown in FIG. 18, the average value A may be calculated by using pan and tilt inclination information associated with a predetermined number of images after and before the target image (indicated using an oblique line in the figure). More specifically, the average value A is calculated using pan and tilt inclination information in a range of ±m images in which the target image is used as a reference, which is indicated as a range "X" in the figure.

In this case, as shown as a shift of part (a) of FIG. 18→part (b) of FIG. 18, each time an image for which the average value A is to be calculated is sequentially shifted, the center of the range X is shifted for every image (that is, every automatic image capturing timing).

In FIG. 18, when the average value A is to be calculated, a description has been given by using, as an example, a case in which only the pan and tilt inclination information (that is, only the pan and tilt inclination information associated with each image) obtained at each automatic image capturing timing is used. Even in a case where pan and tilt inclination information obtained between automatic image-capturing timings in the manner described above is used, the average value A may be calculated by using pan and tilt inclination information obtained in a predetermined period after and before an image for which the average value is to be calculated, which is used as a reference, in a similar manner.

In the manner described above, by calculating the average value A, including those in the past of the automatic image capturing timing of the target image, it is possible to obtain more accurate reference inclination information.

Here, as can be understood from the description thus far in the fourth and fifth embodiments in which swinging of a reproduced image is prevented by display control during reproduction, during reproduction, it is determined whether or not the inclination is within a predetermined range at each automatic image capturing timing. In a case where such a method is to be adopted, in order that the image is displayed, it is necessary to satisfy the condition in which the inclinations in the pan and tilt directions were within a predetermined range at the automatic image capturing timing at which the image was captured. That is, this condition is a very stringent condition when compared to the case in which image obtaining is controlled as in the above-described first to third embodiments. As a result, in a case where the method described with reference to the above-described fourth and fifth embodiments is directly adopted, there is a risk that the number of displayed images becomes extremely small.

Accordingly, as a countermeasure therefor, during recording, captured image data is obtained at a timing other than an automatic image capturing timing, and position information and/or pan and tilt inclination information at that time is obtained, making it possible to display a larger number of images. That is, as a result of the above, the probability that a captured image when the inclinations in the pan direction and the tilt direction are within a predetermined range is increased so that a larger number of images are set as reproduction target images.

Furthermore, in the fourth and fifth embodiments, a case in which a determination as to the inclination and the setting of a reproduction target image are performed in response to a reproduction start instruction has been exemplified. In addition, these processings may be performed automatically in a case in which, for example, the processing of the system controller 2 and the CPU 31 is comparatively idle, so that the setting of the reproduction target image can be completed before the reproduction start instruction. As a result of the above, it is possible to shorten the time period from when a reproduction start instruction is issued until image display is started and also, it is possible to shorten the time period for the user to wait from when operation is input until the display is started.

Furthermore, in the description thus far, a case in which the information processing apparatus constituting the image display system according to the embodiment of the present invention is a personal computer has been exemplified. In addition, for the information processing apparatus according to the embodiment of the present invention, for example, another information processing apparatus, such as a PDA, may be used.

Furthermore, for the display control apparatus according the embodiment of the present invention, another apparatus other than the image-capturing apparatus and the personal computer may be used.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus for performing display control of an automatically captured image with which information on an inclination in a pan direction or in a tilt direction is associated, the display control apparatus comprising:
   at least one processor configured to perform:
      a determination process configured to determine whether or not the inclination of the captured image data is within a predetermined range on the basis of the information on the inclination associated with captured image data as the automatically captured image and the predetermined range is based on a calculated average value of a plurality of inclinations; and
      a display control process configured to perform control so that captured image data in which the inclination has been determined to be within the predetermined range on the basis of the determination result by the determination process is displayed on a display,
   wherein the information on an average value of inclinations, which is calculated in correspondence with the time at which the image was captured by automatic image capturing, together with the inclination information, is associated with the captured image data,
   wherein, in the determination process, a determination of whether or not the inclination is within a predetermined range in which the average value is used as a reference is made for each item of captured image data on the basis of the inclination information and the information on the average value of inclinations, which are associated with each item of captured image data, and
   wherein, in the display control process, control is performed so that captured image data in which the inclination has been determined to be within the predetermined range as a result of the determination by the determination process is displayed on the display.

2. The display control apparatus according to claim 1, wherein both the information on the inclination in the pan direction and the information on the inclination in the tilt direction, the information on the inclination in the pan direction and the information on the inclination in the tilt direction being detected by a two-axis gyro sensor, are associated as the inclination information with the captured image data.

3. The display control apparatus according to claim 1, wherein the information on the inclination in the pan direction, the inclination being detected by a direction sensor, is associated as the inclination information with the captured image data.

4. The display control apparatus according to claim 1, wherein information on the direction of the inclination in the pan direction, the inclination being detected by a direction sensor, is associated as the inclination information with the captured image data, information on a traveling direction of a user, which is estimated in correspondence with the time at which the image was captured by automatic image capturing is further associated as the inclination information with the captured image data,
   wherein, in the determination process, a determination is made for each item of captured image data as to whether or not the direction of the inclination in the pan direction is within a predetermined angle range in which the traveling direction is used as a reference on the basis of the information on the direction of the associated inclination in the pan direction and the information on the traveling direction, which are associated with each item of captured image data, and
   wherein, in the display control process, control is performed so that the captured image data in which the direction of the inclination in the pan direction has been determined to be within the predetermined angle range as a result of the determination by the determination process is displayed on the display.

5. The display control apparatus according to claim 1, wherein the at least one processor is configured to perform, for each item of captured image data, an average value calculation process for calculating an average value of inclinations corresponding to the time at which each item of captured image data was captured on the basis of the information on the inclination associated with a plurality of items of captured image data whose capturing times are close to one another by automatic image capturing;
   wherein the determination process is further configured to determine, for each item of captured image data, whether or not the associated inclination is within a predetermined range in which the average value calculated by the average value calculation process is used as a reference, and
   wherein the display control process is further configured to perform control so that captured image data in which the inclination has been determined to be within the predetermined range as a result of the determination by the determination process is displayed on the display.

6. The display control apparatus according to claim 5, wherein, in the average value calculation process, the average value is calculated using the information on the inclination of the captured image data whose capturing time by automatic image capturing is in the past.

\* \* \* \* \*